US012578569B2

(12) United States Patent     (10) Patent No.:   US 12,578,569 B2

Wildner et al.     (45) Date of Patent:    Mar. 17, 2026

(54) METHOD OF PROVIDING AN ASSEMBLED IMAGE USING DIGITAL MICROSCOPE, DIGITAL MICROSCOPE SYSTEM, AND PROGRAM FOR PROVIDING AN ASSEMBLED IMAGE USING A DIGITAL MICROSCOPE

(71) Applicant: PreciPoint GmbH, Freising (DE)

(72) Inventors: Ludwig Wildner, Freising (DE); Fritz Muller, Munich (DE)

(73) Assignee: PreciPoint GmbH, Freising (DE)

( * ) Notice: Subject to any disclaimer, the term of this patent is extended or adjusted under 35 U.S.C. 154(b) by 0 days.

(21) Appl. No.: 18/285,174

(22) PCT Filed: Mar. 30, 2022

(86) PCT No.: PCT/EP2022/058461

§ 371 (c)(1),
(2) Date: Sep. 29, 2023

(87) PCT Pub. No.: WO2022/207731

PCT Pub. Date: Oct. 6, 2022

(65) Prior Publication Data

US 2024/0176126 A1     May 30, 2024

(30) Foreign Application Priority Data

Mar. 31, 2021    (EP) .................................... 21166379

(51) Int. Cl.
| | |
|---|---|
| *G02B 21/36* | (2006.01) |
| *G02B 21/00* | (2006.01) |
| *G02B 21/24* | (2006.01) |

(52) U.S. Cl.
CPC ....... *G02B 21/367* (2013.01); *G02B 21/0072* (2013.01); *G02B 21/245* (2013.01); *G02B 21/248* (2013.01)

(58) Field of Classification Search
CPC .............. G02B 21/367; G02B 21/0072; G02B 21/245; G02B 21/248; G02B 7/16
See application file for complete search history.

(56) References Cited

U.S. PATENT DOCUMENTS

| | | |
|---|---|---|
| 5,276,550 A | 1/1994 | Kojima |
| 6,259,473 B1 | 7/2001 | Iko |

(Continued)

FOREIGN PATENT DOCUMENTS

| | | |
|---|---|---|
| EP | 0388812 B1 | 8/1995 |
| WO | 2016092821 A1 | 6/2016 |

OTHER PUBLICATIONS

Kayser et al. "Interactive and Automated Application of Virtual Microscopy", Diagnostic Pathology, vol. 6, No. 1, Mar. 30, 2011.

(Continued)

*Primary Examiner* — Alazar Tilahun

(74) *Attorney, Agent, or Firm* — Getz Balich LLC

(57) ABSTRACT

A method of providing an assembled image using a digital microscope is provided. The digital microscope includes an optical system having an objective revolver equipped with microscope objectives, an image sensor, and a stage. The stage is movable in relation to the optical system and the image sensor. The method includes: receiving a user selection regarding an area of interest of the sample, the user selection being indicative of the position and extension of the area of interest; depending on the user selection, selecting a microscope objective and controlling the objective revolver to place the particular microscope objective into an optical path of the optical system; moving the stage with respect to the optical system and the image sensor, and generating individual images of the area of interest; and combining the individual images into the assembled image, representing the area of interest.

13 Claims, 5 Drawing Sheets

(56)　　　　　　References Cited

U.S. PATENT DOCUMENTS

| | | | |
|---|---|---|---|
| 6,944,326 B1 | 9/2005 | Ganser | |
| 10,539,775 B2 | 1/2020 | Tanaka | |
| 2006/0034543 A1* | 2/2006 | Bacus | G06T 3/4038 |
| | | | 382/128 |
| 2006/0045505 A1* | 3/2006 | Zeineh | G02B 21/367 |
| | | | 396/89 |
| 2007/0081231 A1 | 4/2007 | Shirota | |
| 2010/0194873 A1* | 8/2010 | Viereck | G02B 21/367 |
| | | | 348/79 |
| 2010/0309306 A1 | 12/2010 | Uchiyama | |
| 2012/0082364 A1 | 4/2012 | Tani | |
| 2013/0128024 A1* | 5/2013 | Kishima | G01N 21/6428 |
| | | | 348/79 |
| 2015/0185464 A1* | 7/2015 | Karube | H04N 13/275 |
| | | | 348/44 |
| 2017/0219810 A1* | 8/2017 | Ganser | G02B 21/06 |
| 2018/0209905 A1 | 7/2018 | Iketaki | |

OTHER PUBLICATIONS

JP Office Action for JP Application No. 2023-559786 dated Jan. 6, 2026.

\* cited by examiner

METHOD OF PROVIDING AN ASSEMBLED IMAGE USING DIGITAL MICROSCOPE, DIGITAL MICROSCOPE SYSTEM, AND PROGRAM FOR PROVIDING AN ASSEMBLED IMAGE USING A DIGITAL MICROSCOPE

This application claims priority to PCT Patent Appln. No. PCT/EP2022/058461 filed Mar. 30, 2022, which claims priority EP Patent Appln. No. 21166379.4 filed Mar. 31, 2021, which are herein incorporated by reference.

BACKGROUND OF THE INVENTION

1. Technical Field

The present invention is in the field of digital microscopy. In particular, the present invention is in the field of generating a digital image of a portion of a sample viewed via a digital microscope.

2. Background Information

Recent advances in technology aim at replacing conventional analog microscopes with digital microscopes. Current digital microscopes commonly operate in one of the following two operating modes. In one operating mode, the digital microscope is operated like a conventional analog microscope. The stage, holding the sample to be viewed, is driven to a desired location, and a single image is taken via the camera of the digital microscope, the single image corresponding to the position of the stage. The single image is presented to the user. In another operating mode, the user requests an image of the sample, and the microscope completes a row-wise or column-wise scan of the sample, assembling the image of the sample from the individual images taken during the scanning. These operating modes of current digital microscopes are not well-suited to all usage scenarios of digital microscopes.

Accordingly, it would be beneficial to provide a digital microscope system and a method of providing an assembled image using a digital microscope that allow for an improved handling by the user.

SUMMARY OF THE INVENTION

Exemplary embodiments of the invention include a method of providing an assembled image using a digital microscope, the digital microscope comprising an optical system having an objective revolver equipped with a plurality of microscope objectives, an image sensor, and a stage for holding a sample, the stage being movable in relation to the optical system and the image sensor, the method comprising: receiving a user selection regarding an area of interest of the sample, the user selection being indicative of the position and extension of the area of interest; depending on the user selection, selecting a particular one of the plurality of microscope objectives and controlling the objective revolver to place the particular one of the plurality of microscope objectives into an optical path of the optical system; moving the stage with respect to the optical system and the image sensor, and generating individual images of the area of interest; and combining the individual images into the assembled image, representing the area of interest.

Exemplary embodiments of the invention allow for an adaptation of the optical set-up of the optical system, in particular an adaptation of the magnification of the optical system, to the user selection regarding an area of interest of the sample. An image of that portion of the sample that the user is truly interested in may be provided with an optimized trade-off between image quality and speed of provision. In particular, by providing a selection between different microscope objectives, a fast generation of the assembled image from a lower number of individual images, being the result of a comparably smaller magnification, may be taken advantage of, in case a comparably low resolution of the desired sample image may be sufficient. For example, in case the user selection indicates that the user is interested in a rather large portion of the sample, i.e. in case the user selection indicates that the extension of the area of interest is rather large, a smaller magnification may be selected and the number of individual images, needed for generating a representation of said comparably large portion of the sample, may be kept within acceptable limits for reaching a high speed provision of the assembled image. In other words, based on the assumption that a user who is interested in a rather large portion of the sample is satisfied with a less than maximum resolution of the assembled image, a microscope objective with a smaller magnification may be selected, thus improving the speed in generating the assembled image without compromising the user's needed resolution for the momentary use case. Conversely, in case the user selection indicates a rather small area of interest, a comparably larger magnification may be selected. In that case, the comparably higher number of individual images per sample area may still be provided in a rather fast operation, given the overall smaller area of interest, and the user is provided with high image quality for the selected small area of interest.

The digital microscope has an optical system. The optical system may be any kind of optical system, having an objective revolver and being suitable for providing various optical set-ups, in particular various magnifications, for the digital microscope. In particular, the optical system may comprise a plurality of microscope objectives, arranged on the objective revolver, and a tube objective. The magnification of a particular optical set-up may be a set value, depending on the particular combination of the selected microscope objective and the tube objective. While the magnification may be the result of the joint operation of the microscope objective and the tube objective, it is customary in the field of microscopy to assign a magnification value to the microscope objective, knowing that the stated magnification may be achieved by the combined impact of microscope objective and the tube objective. The tube objective may be arranged between the objective revolver, having the plurality of microscope objectives, and the image sensor. The tube objective may also be referred to as tube lens.

The method comprises controlling the objective revolver to place the particular one of the plurality of microscope objectives into the optical path of the optical system. The optical path of the optical system is the light path from the stage to the image sensor. With the selected microscope objective being placed in said optical path, the optical path is from the stage through the selected microscope objective to the image sensor. The optical path may run through additional components, such as the tube objective discussed above. The optical path may also contain a light path segment from an illumination assembly to the stage.

The digital microscope has a stage for holding a sample. The sample may be provided in the form of a microscope slide, also simply referred to as slide herein. The slide may be positioned on the stage or may be introduced in a device designed specifically for holding slides. The substance/ material to be examined may be placed on/within said slide, and the slide may provide a well-defined mechanical structure for placing the sample reliably on the stage. The stage may have a light transmissive portion, onto which the sample may be placed. It is also possible that the stage has a frame-like structure, with the sample being placed in an empty space in the center of said frame.

The stage is movable in relation to the optical system and the image sensor. In particular, the digital microscope may have a stage drive assembly that drives the stage with respect to the optical system and the image sensor. The optical system and the image sensor may be substantially stationary in the microscope frame of reference. In particular, the objective revolver may be substantially stationary in the microscope frame of reference, with the revolving action of the objective revolver changing the set-up of the optical system by changing the selection of the microscope objective. The stage may be movable in two dimensions via the stage drive assembly, such that a two-dimensional scan of the sample may be carried out. In particular, the stage may be movable in an x/y plane, with the optical path passing the stage substantially in the z-direction. The stage may further be movable towards/away from the optical system and the image sensor, in particular movable in the z-direction. This dimension of movement may be comparably small and may be provided for focusing purposes only. However, it is also possible that a larger movement in the z-direction of the stage is available for facilitating various kinds of measurements and/or facilitating a large range of different magnifications.

The digital microscope has an image sensor. The image sensor may be part of a digital camera. Accordingly, it may also be said that the digital microscope has a digital camera having an image sensor. The digital camera may have additional components commonly encountered in a camera, such as a shutter, an image sensor driver, etc.

The method comprises receiving a user selection regarding an area of interest of the sample. The area of interest may also be described as a field of view that the user is interested in. This field of view may in particular be a field of view that the user wants to be displayed on a screen that cooperates with the digital microscope. The area of interest of the sample, which the user is interested in, corresponds to a particular portion of the stage, where said area of interest of the sample is located. Due to this correspondence between the area of interest of the sample and the corresponding portion of the stage, the stage may be moved in a manner to generate individual images of the area of interest.

The term generating individual images of the area of interest refers to generating individual images of individual portions of the sample in the area of interest. The individual images may be generated in a scan of the area of interest. The individual images of neighboring portions of the area of interest may have an overlap. The term generating individual images of the area of interest refers to generating individual images of the area of interest using the particular one of the plurality of microscope objectives.

The user selection indicates the position and extension of the area of interest. In particular, the user selection may implicitly specify the position and extension of the area of interest. For example, a user may make the user selection by zooming into and laterally navigating an image preview of the sample. Such zooming and laterally navigating may be done by a touch screen or via the operation of a mouse or via any other suitable input device. The position and the extension of the area of interest may result from the zooming and navigating with respect to the image preview. It is pointed out that the area of interest of the sample may be selected by the user in any suitable manner, as long as the method receives a user selection, the information of which may allow for a derivation of the position and extension of the area of interest.

The method comprises receiving a user selection regarding an area of interest of the sample. The user selection may be any suitable kind of user selection. The user selection may be received from a human user via a suitable user interface, in particular via a suitable GUI. It is possible that the user selection is generated by a human user in a remote location and received via an extended communication network, such as via the internet. It is also possible that the user selection is a machine-generated user selection. The user selection may in particular be the result of a machine selection of an area of interest. The user selection may be generated by a machine in accordance with conventionally programmed algorithms and/or may be generated via machine learning/artificial intelligence.

The digital microscope may be a digital light microscope. The digital light microscope may have an illumination assembly that is configured for outputting light towards the stage/sample. In particular, the digital microscope may be a transmitted light microscope, with an illumination assembly and the image sensor being arranged on opposite sides of the stage/sample. In an operating position of the digital microscope, the illumination assembly may shine light upwards from a lower portion of the digital microscope towards the stage/sample and towards the optical system and image sensor.

According to a further embodiment, the plurality of microscope objectives have objective-specific magnifications and said selecting of the particular one of the plurality of microscope objectives is based on the extension of the area of interest and the objective-specific magnifications of the plurality of the microscope objectives. In particular, at least one threshold, i.e. one or more thresholds, may be provided for the extension of the area of interest, and the particular one of the plurality of microscope objectives may be selected on the basis of a comparison of the extension of the area of interest and the one or more thresholds. In particular, the dependency between the threshold(s) and the objective-specific magnifications may be as follows: for an increase in the extension of the area of interest, in particular for an increase in the extension of the area of interest above a particular threshold, a microscope objective with a lower objective-specific magnification may be selected. The expression of the plurality of microscope objectives having objective-specific magnifications means that at least two of the microscope objectives have different objective-specific magnifications. In particular, more than two or all of the microscope objectives, arranged on the objective revolver, may have different objective-specific magnifications. However, it is also possible that certain subsets of the microscope objectives have the same or a comparable magnification, but differ in other properties. For example, it is possible that two microscope objectives have the same or a corresponding magnification, but one is adapted to the passage of visible light, while the other one is adapted to the passage of ultraviolet (UV) light. As discussed above, by providing different objective-specific magnifications and by selecting the particular microscope objective on the basis of the extension of the area of interest and the objective-specific magnifications, a particularly good trade-off between the speed of provision of the assembled image and the quality/resolution of the assembled image may be achieved.

According to a further embodiment, the objective revolver comprises a motor and said controlling of the objective revolver comprises controlling the motor to rotate the objective revolver to place the particular one of the plurality of microscope objectives into the optical path of the optical system. The motor may in particular be an electric motor. Further in particular, the motor may be an electric motor controlled via a closed loop control system. A position sensor of the closed loop control may be capable of distinguishing at least one million positions around a full revolution of the objective revolver, in particular between one million and five million positions, further in particular between one million and three million positions. In this way, the closed loop control may be able to achieve a positioning accuracy of the selected particular one of the plurality of microscope objectives of below 0.2 µm, in particular a positioning accuracy of between 0.05 µm and 0.2 µm.

According to a further embodiment, said selecting of the particular one of the plurality of microscope objectives is carried out such that said moving of the stage with respect to the optical system and the image sensor and said generating of the individual images of the area of interest takes place in a recording interval of less than 10 seconds, in particular less than 5 seconds. There may be a known relationship between the extension of the area of interest and the number of individual images required for the given extension of the area of interest for the given microscope objectives and the resulting recording interval for generating said number of individual images. This known relationship may be given as a formula or as a look-up table or in any other suitable form for comparing the resulting recording intervals for the different microscope objectives. On the basis of this knowledge, the method may select that microscope objective that has the largest magnification, but still allows for the generating of the individual images to take place in the desired recording interval of less than 10 seconds, in particular less than 5 seconds. It is pointed out that other recording interval thresholds may also be used for selecting the particular one of the plurality of microscope objectives. With such an approach, it may be ensured that the duration of the recording interval is short enough that a user is presented with an assembled image of the area of interest at an acceptable quality/resolution in an amount of time that allows for convenient browsing within a sample. In other words, a navigation of the sample with such small delays may be achieved that a user experiences the browsing within the sample as sufficiently close to real-time browsing to have a positive working experience with the digital microscope.

According to a further embodiment, said controlling of the objective revolver to place the particular one of the plurality of microscope objectives into the optical path of the optical system takes place in a preparation interval of less than 1 second, in particular less than 0.5 seconds. The preparation interval may in particular refer to the switch between two neighboring microscope objectives in the objective revolver. The neighboring objectives in the microscope objectives may in particular be those that have neighboring magnifications. In other words, the microscope objectives may be arranged with increasing/decreasing magnifications around the objective revolver. During browsing within a sample, a switch between microscope objectives having neighboring magnifications may be more likely than a switch between microscope objectives having very different magnifications. Accordingly, for the most likely switches of microscope objectives, very short preparation intervals may be achieved. With the combination of a very short preparation interval and a very short recording interval, as discussed above, an overall very quick provision of the assembled image may be achieved.

According to a further embodiment, the objective revolver is equipped with three or four or five microscope objectives. With said numbers of microscope objectives, a particularly beneficial trade-off between freedom of choice regarding the optical set-up, in particular freedom of choice regarding the available levels of magnification, and size and complexity of the objective revolver and speed in switching between different microscope objectives may be achieved. This may be particularly true for an objective revolver being equipped with four microscope objectives.

According to a further embodiment, the plurality of microscope objectives comprise at least two of a 10× magnification microscope objective, a 20× magnification microscope objective, a 40× magnification microscope objective, a 60× magnification microscope objective, and a 100× magnification microscope objective. In a particular embodiment, the objective revolver may be equipped with a 10×, a 20×, a 40×, and a 60× magnification microscope objective. In another particular embodiment, the objective revolver may be equipped with a 20×, a 40×, a 60×, and a 100× magnification microscope objective. While the former may be particularly suitable for a transmitted light microscope, when examining the sample in an un-immersed state, the latter may be particularly suitable for use cases where the sample is immersed in an immersion liquid, in particular immersed in an immersion oil. In yet another particular embodiment, the objective revolver is equipped with a first 20×, a second 20×, a 40×, and a 60× magnification microscope objective. The two 20× magnification microscope objectives may differ in their optical properties, such as in the adaptation to particular wavelengths/wavelength ranges. It is also possible that one of the objective positions of the objective revolver remains free of a magnifying microscope objective or is equipped with a non-magnifying device, such as a light guide device. As will be described in more detail below, the digital microscope may have one or more additional functions that may work best without magnification at the objective revolver portion of the optical path. With the objective revolver, such additional functionality may be conveniently integrated into the digital microscope. For the purpose of describing the functionality of the objective revolver, such non-magnifying devices may also be seen as part of the group of microscope objectives.

According to a further embodiment, the method further comprises adapting an x/y offset of the stage, depending on the area of interest and the particular one of the plurality of microscope objectives. In this way, the number of individual images, required for generating the assembled image, may be kept at a minimum for the area of interest and the selected particular one of the plurality of microscope objectives, thus contributing to a particularly quick provision of the assembled image. The adapting of the x/y offset of the stage may ensure that no large extra area or even no extra area at all beyond the area of interest is captured for the selected combination of the area of interest and the particular one of the plurality of microscope objectives. In particular, upon switching the microscope objective via turning the objective revolver, the adapting of the x/y offset of the stage may allow for an optimized congruence between a previously generated assembled image and a newly generated assembled image, in particular in response to a zooming in operation.

According to a further embodiment, the method further comprises focusing the stage with respect to the particular one to the plurality of microscope objectives. In particular, the focusing of the stage may include an adapting of a z-offset of the stage with respect to the particular one of the plurality of microscope objectives. The focusing of the stage may be done via calibration data or via the capturing of a test image(s) or in another suitable automated manner. The calibration data may be collected and stored during an initial test phase of the digital microscope and may be used as a static set of calibration data during the production operation of the digital microscope.

According to a further embodiment, said receiving of the user selection regarding the area of interest comprises receiving a selection of a particular rectangular portion within the sample. In a particular embodiment, said receiving of the user selection may comprise receiving a selection of a particular rectangular portion indicated via two opposite corner points. In this way, the user may conveniently and intuitively indicate the area of interest via a familiar input device, such as via a computer mouse.

According to a further embodiment, said receiving of the user selection regarding the area of interest comprises receiving a point selection within the sample and defining a rectangular portion around the point selection as the area of interest. In this way, the user may be provided with the option to specify the area of interest via a single point selection operation. The method may define the rectangular portion around the point selection as the area of interest on the basis of statistical and/or historic user data that is indicative of extensions of areas of interest that are commonly considered interesting to the user.

According to a further embodiment, said receiving of the user selection regarding the area of interest comprises receiving an incremental selection command, such as a zoom command or a lateral navigation command, also referred to as panning command. In this way, the user may select the area of interest via intuitive and familiar commands on a touchscreen/touchpad.

According to a further embodiment, the digital microscope comprises a diverter, arranged between the objective revolver and the image sensor or movable to a diverting position between the objective revolver and the image sensor, and at least one function enhancing detector, optically coupled to the diverter, wherein the method comprises: depending on the user selection, which additionally comprises a function selection, selecting a particular one of the plurality of microscope objectives and controlling the diverter and/or the at least one function enhancing detector to carry out at least one additional measurement with respect to the area of interest. In this way, the digital microscope and the method of providing an assembled image using said digital microscope may provide additional functionality in addition to the above-described different levels of magnification and regular image generation by combining the individual images into the assembled image. In particular, the at least one function enhancing detector may be adapted to a particular kind of light source, such as a particularly narrow band light source or a particularly focused light source or a broadband light source outside the visible spectrum, e.g. an ultraviolet (UV) light source or a near infrared or infrared light source. The at least one function enhancing detector may in particular be a monochromatic detector, such as a particularly sensitive monochromatic detector.

The diverter may be any kind of diverter that is suitable for diverting light from the light path, extending between the stage/sample and the image sensor, towards the at least one function enhancing detector. For example, the diverter may be a reflector that is movable between a diverting position between the objective revolver and the image sensor and a disengaged position outside of the light path between the objective revolver and the image sensor. In another example, the diverter may be a dichroic mirror that is movable between said diverting position and said disengaged position or that is permanently arranged between the objective revolver and the image sensor. The dichroic mirror may have a single wavelength threshold that determines whether light is passed through by the dichroic mirror or reflected by the dichroic mirror. It is also possible that the dichroic mirror is a single bandpass dichroic mirror or a multiple bandpass dichroic mirror that reflects a single wavelength band or multiple wavelength bands towards the at least one function enhancing detector, while passing other wavelengths on to the image sensor. The diverter may also be an electrically controlled component whose reflective/transmissive properties can be electrically controlled, e.g. via the application of a controlling electric field or a controlling electric potential. For example, the diverter may be a birefringent crystal mirror. The diverter may also be made from an acousto-optically controlled crystal material.

The at least one function enhancing detector may comprise one or more function enhancing detectors, with each of the one or more function enhancing detectors being suitably adapted to their particular function. For example, the function enhancing detector may be a single point detector, such as a photomultiplier or an avalanche photo diode. A single point detector may in particular be used together with a single point light source, as discussed below. The function enhancing detector may also comprise an array of photo-sensitive cells. For example, the function enhancing detector may comprise a CCD array or a CMOS array, adapted to a particular illumination/excitation. The function enhancing detector may also be a spectrometer/monochromator type detector. The spectrometer/monochromator type detector may have an optical array or a prism or an optical grating or another suitable optical component for splitting up different wavelengths/for mapping different wavelengths to different positions of the optical detector. In this way, the function enhancing detector may allow for spectrometric analysis. The described additional functionality/functionalities may be made possible via a suitable equipping and operating of the objective revolver, without having two substantially re-assemble the digital microscope.

According to a further embodiment, the digital microscope comprises a visible light illumination assembly, configured for providing a broad band visible light output, and at least one function enhancing illumination assembly, wherein the visible light illumination assembly and the at least one function enhancing illumination assembly are arranged to emit illumination/excitation towards the stage/sample, potentially via re-directing optical components. The visible light illumination assembly may be configured for providing white light or for providing a sub-spectrum of the visible light spectrum. The at least one function enhancing illumination assembly may comprise one or more function enhancing illumination assemblies. A function enhancing illumination assembly may be an illumination assembly that is configured for providing a more narrow band illumination, as compared to the visible light illumination assembly, and/or for providing light outside the visible light spectrum. More in particular, a function enhancing illumination assembly may be configured to provide ultraviolet light or infrared light or visible light of a narrow wavelength spectrum. Yet further in particular, a function enhancing illumination assembly may comprise a laser light source or two laser light sources or more than two laser light sources. The laser light source may be a single point source or a multipoint source.

Further, being a laser light source, the laser has a highly collimated light output and provides for a highly focused, high-energy illumination of a very small portion of the stage/sample. With a laser light source/multiple laser light sources and different types of function enhancing detectors, various options for examining the sample in addition to the regular light microscope illumination may be provided. The function enhancing illumination assembly may also comprise an LED light source, in particular an incoherent LED light source, which may for example be used for fluorescence-based measurements. It is also possible that the function enhancing illumination assembly comprises various combinations of light sources, such as two narrow band light sources or two broad band light sources or a combination of a narrow band light source and a broad band light source, etc. With the objective revolver being able to carry suitable components for these additional functions and/or providing a way of passing the light from the function enhancing illumination assembly and/or the response from the sample right through this part of the optical system, the additional functionality may be embedded in the digital microscope without having to substantially re-configure the same.

According to a further embodiment, the at least one function-enhancing detector comprises at least one of a Raman spectroscopy detector, a CARS (Coherent Anti-Stokes Raman Scattering) detector, an SRS (Stimulated Raman Scattering) detector, an SHG (Second Harmonic Generation) detector, a TPEF (Two Photon Excited Fluorescence) detector, and a FLIM (Fluorescence Lifetime Imaging) detector.

According to a further embodiment, the image sensor has a predefined number of image pixels and the method further comprises: depending on the user selection, selecting one of a full resolution mode, wherein the individual images are generated with the predefined number of image pixels, and a reduced resolution mode, wherein the individual images are generated with a reduced number of image pixels, as compared to the predefined number of image pixels. The selecting of one of the full resolution mode and the reduced resolution mode may in particular be carried out depending on the user selection and the selected particular one of the plurality of microscope objectives. The selection between the full resolution mode and the reduced resolution mode may provide another degree of freedom for optimizing the trade-off between image quality and speed of provision of the assembled image. In particular, a sensor-side adaptation of the generation of the individual images, which eventually combine to the assembled image, in accordance with the user selection regarding an area of interest of the sample may be enabled. In particular, by providing a selection between the full resolution mode and the reduced resolution mode for the generation of the individual images, the faster image processing of individual images with a reduced number of image pixels may be taken advantage of in case the user selection indicates that a comparably small resolution of the desired sample image is sufficient, in particular a comparably small resolution for the selected particular one of the plurality of microscope objectives. For example, in case the user selection indicates that the user is interested in a rather large portion of the sample for the selected particular one of the plurality of microscope objectives, the reduced resolution mode may be selected and the comparably large number of individual images, needed for generating a representation of said comparably large portion of the sample, may be achieved with superior speed, as compared to using the full resolution mode. In other words, based on the assumption that a user who is interested in a rather large portion of the sample, for the selected particular one of the plurality of microscope objectives, is satisfied with a less than maximum resolution of the assembled image, the reduced resolution mode may be selected, thus improving the speed in generating the assembled image without compromising the user's needed resolution for the momentary use case. In case the user selection indicates a rather small area of interest, for the selected particular one of the plurality of microscope objectives, the full resolution mode may be selected. In that case, the comparably lower number of individual images, needed for generating the assembled image, may still be provided in a rather fast operation, and the user is provided with high image quality for the selected small area of interest.

The selection between the full resolution mode and the reduced resolution mode may provide a way of fine-tuning the trade-off between image quality and speed of provision, after a particular one of the plurality of microscope objectives has been selected in accordance with the user selection regarding the area of interest. The selection of a particular one of the plurality of microscope objectives and the selection of the full resolution mode or the reduced resolution mode may cooperate to achieve a particular good trade-off between image quality of the assembled image and speed of provision of the assembled image.

In the full resolution mode, individual images are generated with the predefined number of image pixels. In contrast thereto, in the reduced resolution mode, individual images with a reduced number of image pixels are generated. The reduced number of image pixels allows for an image data processing of the individual images with enhanced speed. For example, a post-processing filter, which may be applied to the image data of the individual images, may work faster with the reduced number of image pixels. Also, when combining the individual images into the assembled image, a stitching operation may work faster on individual images with the reduced number of image pixels. Accordingly, processing speed of image data may be traded off versus resolution of the assembled image, thus adapting the provision of the assembled image to the user selection. The convenience for the user may be improved in an adaptive manner, and the user's speed in analyzing a sample may be enhanced.

According to a further embodiment, the individual images with the reduced number of image pixels are generated by subsampling the predefined number of image pixels of the image sensor. Subsampling is a particularly efficient way of reducing the predefined number of image pixels of the individual images. In particular, subsampling reduces the number of image pixels right at the source, i.e. right at the image sensor such that all ensuing post-processing is carried out with the reduced number of image pixels. The term subsampling refers to reading out a reduced number of measurements from the image sensor, as compared to the full number of measurements available. In other words, subsampling refers to deliberately disregarding part of the image data that is generated at the image sensor. Subsampling may be done by reading out every n-th image pixel of the image sensor, such as every second or third of fourth image pixel, which subsampling may be applied to both dimensions of the image sensor. By applying subsampling, the read-out time for the image sensor may be reduced and the processing time of all ensuing image processing may be reduced. An increase in speed across the entire image processing chain may be achieved.

According to a further embodiment, the individual images with the reduced number of image pixels are generated by down-scaling of image data generated by the image sensor. Down-scaling of image data is another way of reducing the number of image pixels. As compared to subsampling, as described above, all sensed image data is used. However, the image data for a given set of neighboring pixels may be combined into a single pixel. For example, a single resulting pixel may be calculated from a window of 2×2 original pixels or 3×3 original pixels or 4×4 original pixels or 5×5 original pixels, etc., In this way, the number of image pixels may be reduced, while basing the image data of the reduced number of image pixels on all information sensed by the image sensor. Down-scaling may generally be performed at any point in the image processing chain. It is possible to perform down-scaling of image data right after reading out the image data from the image sensor. In this way, the speed increase due to the reduced number of pixels may be taken advantage of over a large portion of the image processing chain. Down-scaling may be performed in accordance with any suitable down-scaling algorithm. Down-scaling algorithms are known per se to the skilled person.

According to a further embodiment, the stage is moved in an at least partly continuous manner in the reduced resolution mode, with the image sensor capturing image data for the individual images when the stage is moving. In this way, the speed for generating the assembled image can be increased even further in the reduced resolution mode. With the image sensor capturing image data for the individual images when the stage is moving, no time-consuming start/stop operation of the stage is to be performed for capturing the image data for the individual images. Accordingly, the image data for the individual images are generated in quick succession, thus allowing for the full image data for the assembled image to be provided in a comparably very short time frame. The capturing of image data for the individual images during the movement of the stage is particularly beneficial in combination with the subsampling of the predefined number of image pixels of the image sensor. Because the subsampling allows for a faster read-out of the image data captured by the image sensor, the image sensor is quick in getting ready for capturing more image data. In this way, successive image capturing operations during movement of the stage can be achieved without creating any problems in terms of interfering with the read-out of the image sensor. The term at least partly continuous manner refers to a generally continuous motion, which may have stops at some positions. For example, there may be stops after a predefined number of image data capturing operations, in order to reach a well-defined starting point for all components of the digital microscope again. There may further be stops when changing the direction of the movement of the stage, such as when capturing a new row or new column of individual images. However, it is also possible that substantially all or all image data is captured when the stage is moving. It can also be said that at least the majority of image data for the individual images is captured when the stage is moving. This does not preclude some image data to be captured when the stage is stopped.

According to a further embodiment, a moving speed of the stage is selected such that a blurring of the image data is restricted to at most two pixels, in particular to at most one pixel. In other words, the moving speed of the stage is selected such that each point of the sample affects at most three pixels, in particular at most two pixels, in the captured image data. In this way, the moving speed of the stage is adapted to the remainder of the system of the digital microscope. The moving speed of the stage and the level of blurring of image data is another dimension for trade-off between speed in provision of the assembled image and image quality. Accordingly, the handling of the digital microscope may again be adapted to the user selection. The term blurring of image data may refer to the level of blurring in the assembled image.

According to a further embodiment, the stage is moved in an intermittent manner in the full-resolution mode with the image sensor capturing image data for the individual images when the stage is in a stopped position. In this way, the quality of the captured image data is particularly high, as there is no risk of blurring due to the movement of the stage, when capturing the image data. The terminology of moving a stage in an intermittent manner refers to a start/stop movement of the stage, which may also be referred to as a drive/stop movement of the stage. The stage drive assembly may be synchronized with the image sensor, in particular with the exposure times of the image sensor, in order to capture image data exactly at the point in time when the stage is in the stopped position.

It has been described above that a good system set-up may be achieved, when the stage is moved in an intermittent manner in the full-resolution mode and when the stage is moved in an at least partly continuous manner in the reduced resolution mode. It is pointed out that, in both the full-resolution mode and the reduced resolution mode, the stage may be moved in an intermittent manner and in an at least partly continuous manner.

According to a further embodiment, the full resolution mode is selected if the extension of the area of interest is smaller than a first objective-specific threshold. In order words, the full resolution mode is selected if the user is interested in a portion of the sample that is smaller than a threshold size, with the threshold size being set depending on the particular one of the plurality of microscope objectives. In this case, it is assumed that the user is interested in a high level of detail, in the context of the system set-up of the selected particular one of the plurality of microscope objectives. Accordingly, a high resolution and, thus, a high image quality of the assembled image is selected. The first objective-specific threshold may be a one-dimensional threshold, e.g. applied to the larger dimension of the area of interest, or may be a two-dimensional threshold or may be an area threshold. For each one of the plurality of microscope objectives, a respective first objective-specific threshold may be given.

According to a further embodiment, the reduced resolution mode comprises a plurality of reduced resolution sub-modes and the step of selecting one of a full resolution mode and a reduced resolution mode comprises selecting one of the full resolution mode and the plurality of reduced resolution sub-modes. In this way, more than two modes of generating the individual images may be provided, thus enabling a more granular adaptation of the selected mode of generating individual images to the user needs. In particular, depending on the extension of the area of interest and depending on the selected particular one of the plurality of microscope objectives, a suitable one of the full resolution mode and the plurality of reduced resolution sub-modes may be selected. For this selection, a plurality of objective-specific thresholds may be provided. Each of the objective-specific thresholds may be a one-dimensional threshold or a two-dimensional threshold or an area threshold, as described above with respect to the first threshold. For each one of the plurality of microscope objectives, respective pluralities of objective-specific thresholds may be given.

According to a further embodiment, each of the plurality of reduced resolution sub-modes has a respective sub-mode specific reduced number of image pixels for the individual images. In other words, the plurality of reduced resolution sub-modes differ with respect to each other with respect to the reduced number of image pixels. Each of the reduced resolution sub-modes has a different reduced number of image pixels for the individual images. The selection of the one of the full resolution mode and the plurality of reduced resolution sub-modes may be a monotonic function between the extension of the area of interest and the number of image pixels for the individual images in the respective modes. In other words, the smaller the extension of the area of interest, the higher the number of image pixels of the individual images may be. The monotonic function between the extension of the area of interest and the number of image pixels for the individual images in the respective modes may be provided separately per microscope objective. In other words, there may be provided a plurality of objective-specific dependencies between the extension of the area of interest and the number of image pixels for the individual images in the respective modes.

According to a further embodiment, the plurality of reduced resolution sub-modes differ in at least one of a level of subsampling the predefined number of image pixels of the image sensor and a level of down-scaling of image data generated by the image sensor. In a particular embodiment, the plurality of reduced resolution sub-modes may differ in both the level of subsampling the predefined number of image pixels of the image sensor and the level of down-scaling of image data generated by the image sensor. It is also possible that the plurality of reduced resolution sub-modes differ with respect to the capturing of the image data being carried out when the stage is moved in an at least partly continuous manner or when the stage is in a stopped position in the course of an intermittent movement. Further, in case the image data is captured when the stage is moving, the plurality of reduced resolution sub-modes may differ with respect to the stage moving speed. In this way, the trade-off between speed of generation of individual images and, thus, the speed of generation of the assembled image and the quality of the assembled image may be adapted in a particularly granular manner for the plurality of reduced resolution sub-modes.

According to a further embodiment, the plurality of reduced resolution sub-modes has two or three or four or five or six reduced resolution sub-modes. A larger number of reduced resolution sub-modes is possible as well.

According to a further embodiment, the user selection further indicates a representation resolution indicative of a desired resolution of the assembled image. It is possible that the selection of the particular one of the plurality of microscope objectives and, if applicable, the selection of the full resolution mode or the reduced resolution mode or one of the plurality of reduced resolution sub-modes may be based on the desired resolution by the user. In this way, the resulting assembled image may be more directly based on the user's wishes. It is also possible that the selection/selections is/are based on the technical properties of the system around the digital microscope, such as the screen depicting the assembled image. In a particular embodiment, the representation resolution is indicative of a screen resolution of a screen for depicting the assembled image. In this way, the selection of the particular one of the plurality of microscope objectives and, if applicable, the selection of the full resolution mode or the reduced resolution mode may allow for the provision of a high quality image, taking into account the screen resolution as well as the zoom level on the sample.

According to a further embodiment, the method further comprises displaying the assembled image on a screen. In this way, the result of the method, as described above, is provided to the user in an intuitive manner. The displayed assembled image may form the basis for a further user selection, also referred to as updated user selection herein, such that the user may reach those areas of the sample that he/she is particularly interested in in an iterative manner.

According to a further embodiment, the individual images are displayed on the screen in a stepwise manner. In particular, the individual images may be displayed on the screen, substantially as they become available after capturing the image data. In this way, the user may be provided with information for deciding on the next steps in the analysis of the sample even before the area of interest is fully displayed on the screen. From the perspective of the user, the assembled image is built up on the screen in a stepwise manner. The stepwise building of the assembled image may start in the middle of the area of interest and may move to the edges of the area of interest afterwards. It is also possible that the assembled image is built up in a row-wise or column-wise manner, potentially starting from a center line or from a center column. The building of the assembled image on the screen in a stepwise manner may be carried out to provide an intuitive reception of the assembled image on the part of the user and/or to convey a notion of speed to the user, thus making the handling of the digital microscope more convenient. The user may experience the provision of the image data in a live mode manner.

According to a further embodiment, the method further comprises: receiving an updated user selection regarding an updated area of interest of the sample, the updated user selection being indicative of the position and extension of the updated area of interest; interrupting the one or more method steps currently being carried out; depending on the updated user selection, re-selecting a particular one of the plurality of microscope objectives and controlling the objective revolver to place the particular one of the plurality of microscope objectives into an optical path of the optical system; moving the stage with respect to the optical system and the image sensor, and generating individual images of the updated area of interest; and combining the individual images into the assembled image, representing the updated area of interest. In this way, the method of providing the assembled image may immediately respond to the user's commands. It may be ensured that the updated area of interest is scanned and transformed into an assembled image without delay due to a previous instance of the method. Accordingly, the user receives the feedback of high responsiveness of the method and can work through the analysis of the sample in a particularly time-efficient manner.

The functionality of receiving an updated user selection and generating an assembled image, representing the updated area of interest, may be particularly suitable for remote working. A user may control the digital microscope from a remote location, and data transmission peaks occur only upon receiving an updated user selection and the provision of an assembled image, representing the updated area of interest. In between said data transmission peaks, no or only very low data exchange between the remote location and the digital microscope takes place. The functionality is therefore well-suited for streaming applications, which can tone down the required/reserved bandwidth in between data transmission peaks. As compared to a continuous stream of live images, the communication efficiency may be greatly increased, without a reduction is perceived responsiveness by the user.

According to a further embodiment, the method further comprises: re-selecting one of the full resolution mode and the reduced resolution mode. The re-selecting of one of the full resolution mode and the reduced resolution mode may in particular be carried out depending on the updated user selection and the re-selected particular one of the plurality of microscope objectives. And the generating of individual images of the updated area of interest may be carried out in accordance with the re-selected one of the full resolution mode and the reduced resolution mode.

Exemplary embodiments of the invention further include a digital microscope system comprising: an optical system having an objective revolver equipped with a plurality of microscope objectives; an image sensor; a stage; a stage drive assembly for moving the stage in relation to the optical system and the image sensor; and a control unit for controlling generation of image data for an assembled image, wherein the control unit is configured to: receive a user selection regarding an area of interest of the sample, the user selection being indicative of the position and extension of the area of interest; depending on the user selection, select a particular one of the plurality of microscope objectives and control the objective revolver to place the particular one of the plurality of microscope objectives into an optical path of the optical system; control the stage drive assembly to move the stage with respect to the optical system and the image sensor; and control the generation of individual images of the area of interest. The additional features, modifications, and beneficial effects, as described above with respect to the method of providing an assembled image using a digital microscope, apply to the digital microscope system in an analogous manner. In particular, it is herewith explicitly disclosed that the control unit may be configured to carry out above-discussed method steps and/or may be configured to cause the components of the digital microscope to carry out above-described method steps. The digital microscope system may be a digital microscope. It is also possible that the digital microscope system is a distributed system comprising a digital microscope and a data processing device, such as a computer, coupled thereto. The control unit may be provided in one of those entities or may be a distributed component among the digital microscope and the data processing device.

The digital microscope may be a light microscope. It may have an illumination assembly that is configured for outputting light towards the stage/sample. In particular, the digital microscope may be a transmitted light microscope, with an illumination assembly and the image sensor being arranged on opposite sides of the stage/sample.

Exemplary embodiments of the invention further include a program for providing an assembled image using a digital microscope, the digital microscope comprising an optical system having an objective revolver equipped with a plurality of microscope objectives, an image sensor, and a stage for holding a sample, the stage being movable in relation to the optical system and the image sensor, the program comprising: receiving a user selection regarding an area of interest of the sample, the user selection being indicative of the position and extension of the area of interest; depending on the user selection, selecting a particular one of the plurality of microscope objectives and controlling the objective revolver to place the particular one of the plurality of microscope objectives into an optical path of the optical system; instructing the stage to move with respect to the optical system; instructing the image sensor to generate image data; on the basis of the image data, generating individual images of the area of interest; and combining the individual images into the assembled image, representing the area of interest. The additional features, modifications, and beneficial effects as described above with respect to the method of providing an assembled image using a digital microscope, apply to the program for providing an assembled image using a digital microscope in an analogous manner. The computer program may contain program code/program instructions that carries out/carry out the method, when executed on a data processing device, such as a computer. The steps of the method may be caused by the program code and carried out by other components, such as the components of the digital microscope, or may be carried out by the data processing device itself.

BRIEF DESCRIPTION OF THE DRAWINGS

Further exemplary embodiments of the invention are described with respect to the accompanying drawings, wherein.

DETAILED DESCRIPTION OF THE INVENTION

Figure 1:
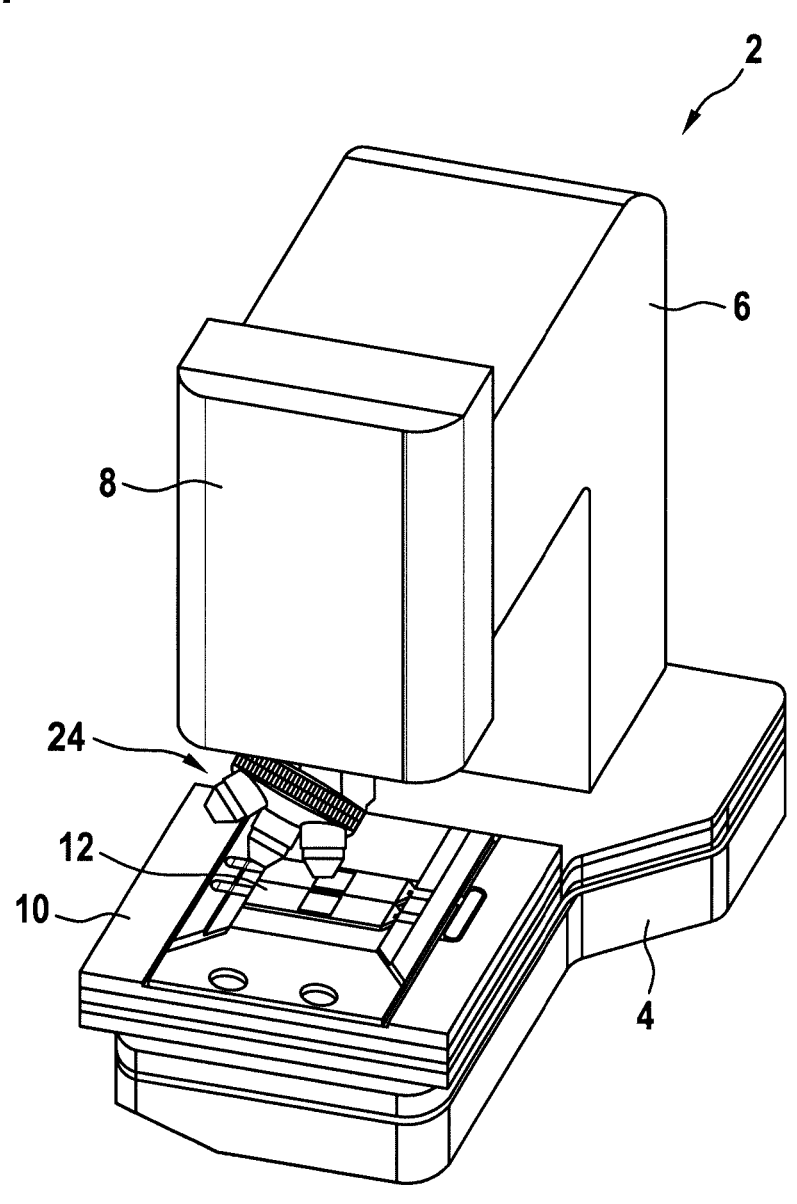
FIG. 1 shows a perspective view of a digital microscope in accordance with an exemplary embodiment of the invention.

FIG. 1 shows a digital microscope 2 in accordance with an exemplary embodiment of the invention in a perspective, three-dimensional view. The digital microscope 2 has a base 4, which supports the digital microscope 2. The base 4 may be placed on a table for providing a secure stand.

The base 4 comprises an illumination assembly and a stage drive assembly, which are blocked from view by a base housing in FIG. 1 and which will be described below. A stage 10 is mounted to the base 4. The stage is movable with respect to the base 4. In particular, the stage 10 is movable in two dimensions, referred to as x- and y-directions herein. In operation, the stage 10 is moved by the stage drive assembly in the x- and y-directions.

The stage 10 has a light transmissive portion, in particular a transparent portion. A sample may be placed on the light transmissive portion. In the operating scenario depicted in FIG. 1, the sample 12 comprises two slides, arranged on the light transmissive portion of the stage 10 via a clipping mechanism. In operation, the illumination assembly illuminates the sample 12 from the bottom. The plane of the light transmissive portion of the stage 10 is referred to as the x/y plane of the digital microscope.

The digital microscope 2 further comprises a support arm 6 and a tube assembly 8. The support arm 6 is shaped to support the tube assembly 8, such that the tube assembly 8 hovers over the stage 10. The tube assembly 8 houses various optical components. In particular, the tube assembly 8 houses a digital camera and an optical system, which in turn has a tube objective and an objective revolver 24 in the exemplary embodiment of FIG. 1. While the digital camera and the tube objective are blocked from view in FIG. 1 by a tube assembly housing, the objective revolver 24 extends from the tube assembly housing towards the stage 10. The objective revolver 24 is equipped with a plurality of microscope objectives, as will be laid out below. The objective revolver 24 may also be referred to as objective turret.

The tube assembly 8 is movable with respect to the support arm 6 in a moving direction orthogonal to the x/y plane. In other words, the tube assembly 8 is movable in the z-direction of the microscope frame of reference. While this movement is quite limited, it is sufficient to bring the sample 12 in focus with respect to the optical system contained in the tube assembly 8.

In operation, the stage drive assembly brings the stage 10 to desired positions in the x- and y-directions. The stage drive assembly may have any kind of suitable actuators, such as two small-scale electric motors for the two directions of movement. The illumination assembly provides for illumination of the sample 12 from underneath, and image data of that portion of the sample 12 placed in the way of light from the illumination assembly to the digital camera can be captured by the digital camera. The captured image data is referred to as an image data of an individual image herein, as it refers to image data corresponding to a singular position of the stage 10 and, thus, of the sample 12 with respect to the optical system and the digital camera. Via driving the stage 10 to various positions, multiple individual images may be generated.

Figure 2:
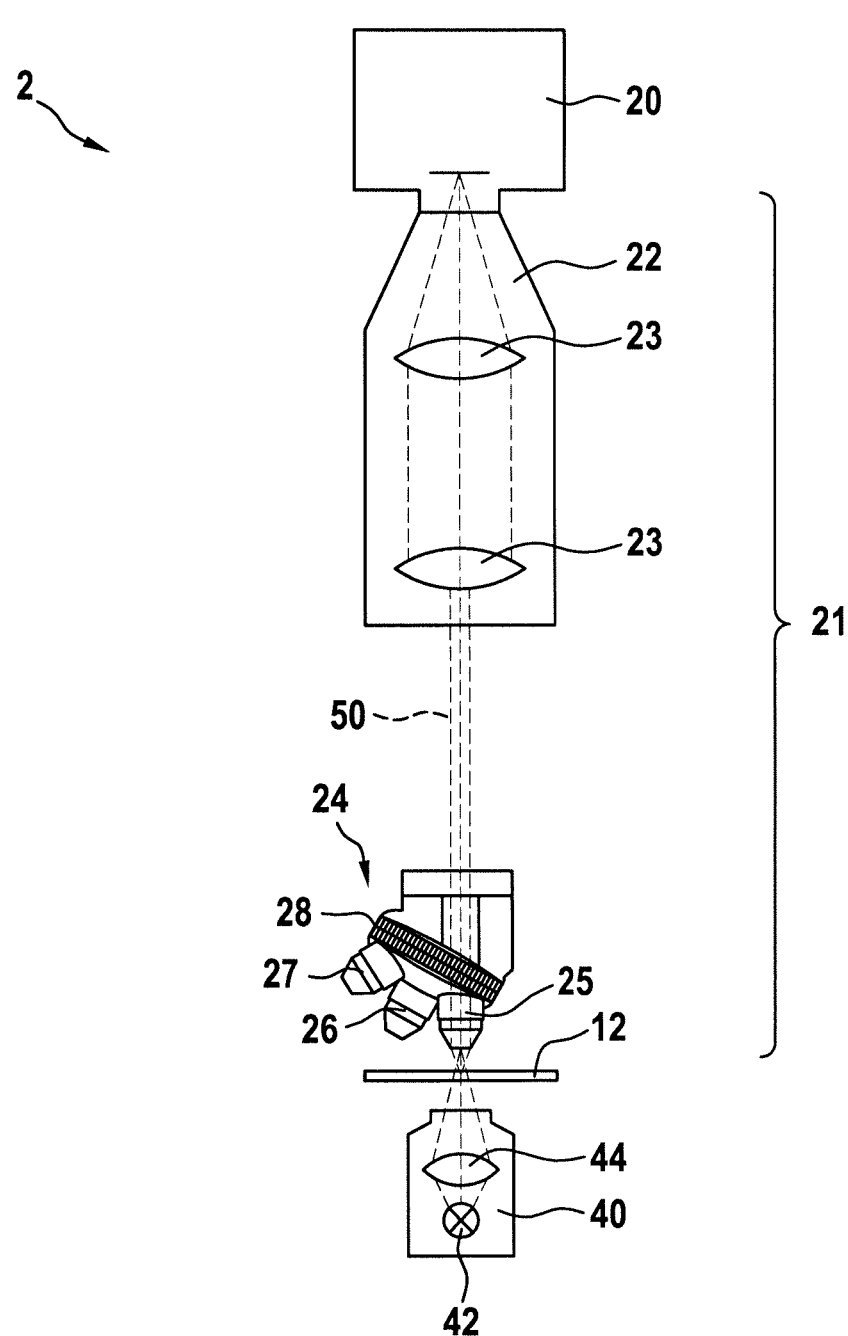
FIG. 2 shows a schematic diagram of selected components of the digital microscope of FIG. 1.

FIG. 2 shows selected components of the digital microscope 2 of FIG. 1 in a schematic view. In particular, FIG. 2 illustrates the components relevant for the illumination of the sample 12 and the directing of light within the tube assembly 8. As described above, the illumination assembly 40 is arranged below the stage 10, i.e. below the sample 12, and directs light upwards towards the sample 12. In the exemplary embodiment of FIG. 2, the illumination assembly 40 has a light source 42 and a collimating lens 44 for directing a large amount of light towards that portion of the sample 12, whose image is captured. The light source 42 may be a white light source, emitting broad band visible light. It is pointed out that the illumination assembly 40 may have any suitable set-up/design.

The digital microscope 2 has an optical system 21. In the exemplary embodiment of FIG. 2, the optical system 21 has a tube objective 22 and an objective revolver 24. The tube objective 22 has individual tubus lenses 23. The objective revolver 24 is equipped with a plurality of microscope objectives. For example, the objective revolver 24 may be equipped with three or four or five or six microscope objectives. In the exemplary embodiment of FIG. 2, the objective revolver 24 is equipped with three microscope objectives, namely a first microscope objective 25, a second microscope objective 26, and a third microscope objective 27. The microscope objectives are arranged on a revolving plate 28 of the objective revolver 24. Via rotating the revolving plate 28, a selected one of the plurality of microscope objectives 25, 26, 27 may be placed in the optical path between the stage/sample 12 and the tube objective 22. The objective revolver 24 may comprise an electric motor, which is arranged for rotating the revolving plate 28. The electric motor 24 may be integrated with the objective revolver 24. In the depicted operating scenario of FIG. 2, the first microscope objective 25 is placed in the optical path between the stage/sample 12 and the tube objective 22. As a result, the first microscope objective 25 may be referred to as the selected particular one of the plurality of microscope objectives in the operating scenario of FIG. 2.

The optical system 21 is provided for achieving a desired magnification of the portion of the sample 12 whose image is captured. The selected one of the plurality of microscope objectives 25, 26, 27 and the tube objective 22 jointly provide a magnification of a portion of the sample 12, with the magnified representation of the portion of the sample 12 being captured by the digital camera 20. In other words, the selected one of the plurality of microscope objectives 25, 26, 27 and the tube objective 22 jointly provide the optical magnification for the individual image to be captured. While the magnification may be a product of both the design of the tube objective 22 and the given microscope objective, it is customary nomenclature to attribute a magnification factor to the microscope objective. On the basis of this nomenclature, the objective revolver 24 may be said to be equipped with a 20× magnification microscope objective, a 40× magnification microscope objective, and a 60× magnification microscope objective in the exemplary embodiment of FIG. 2. It is understood that the set of microscope objectives may alternatively/additionally have microscope objectives with other magnification values.

The digital microscope 2 further has a digital camera 20. The digital camera 20 has an image sensor and a shutter. It may also have other components customary in the field of digital cameras, which may contribute to the operation of the digital camera for capturing image data. The tube objective 22 directs the light, coming from the objective revolver 24, towards the image sensor of the digital camera 20. In this way, a light path 50 from the illumination assembly 40 through the sample 12, through the objective revolver 24, in particular through the selected particular one of the plurality of microscope objectives, through the tube objective 22, and to the image sensor of the digital camera 20 is established. The digital camera 20 may be a digital color camera, for example built with CMOS technology. It is pointed out that the digital camera may be any suitable digital camera for capturing the image data.

Figure 3:
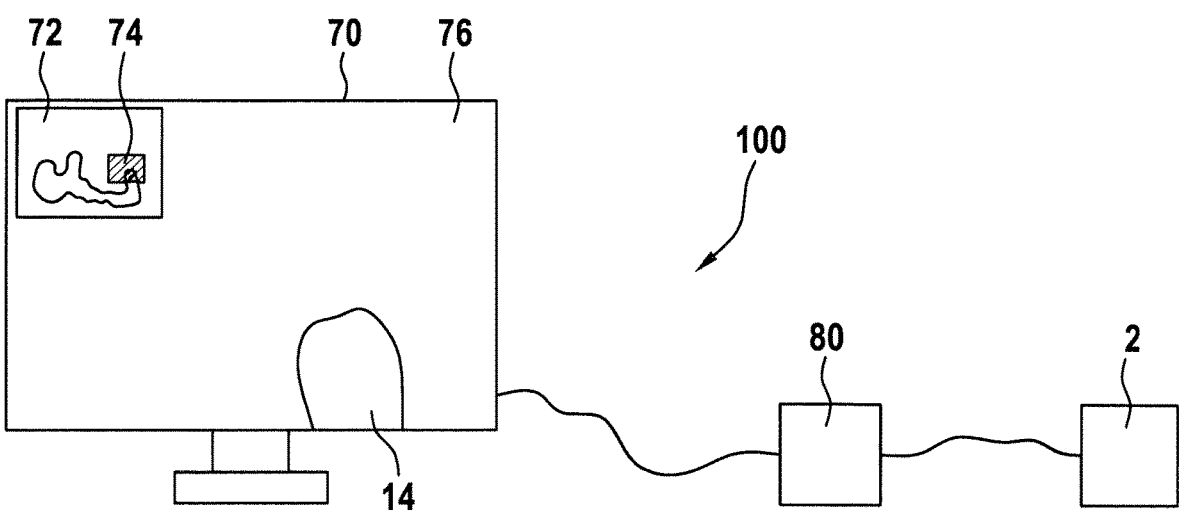
FIG. 3 shows a schematic diagram of a digital microscope system in accordance with an exemplary embodiment of the invention, as seen from a user perspective.

FIG. 3 shows a schematic diagram of a digital microscope system 100 in accordance with an exemplary embodiment of the invention. The digital microscope system 100 comprises a digital microscope 2. The digital microscope 2 may be a digital microscope 2 having the mechanical set-up as described with respect to FIG. 1 above, the optical set-up as described with respect to FIG. 2 above, and the control set-up as will be described below with respect to FIGS. 4 and 5. With respect to FIG. 3, the focus is on the user perspective and the user interaction with the digital microscope system 100.

The digital microscope system 100 further comprises a computer 80, coupled to the digital microscope 2, and a screen 70, coupled to the computer 80. The computer 80 may be any kind of suitable processing device that provides for the interaction between the screen 70 and the digital microscope 2 in a suitable manner. The computer 80 may for example be a standard personal computer, embodied as a desktop computer or a laptop. The processing capacity, exemplarily provided by the computer 80 in the exemplary embodiment of FIG. 3, may also be embedded into the digital microscope 2 or into the screen 70. The screen 70 may for example be part of a tablet or a smartphone, having both the screen functionality and the processing functionality for interfacing directly with the digital microscope 2. It is also possible that the processing capacity, exemplarily provided by the computer 80 in the exemplary embodiment of FIG. 3, may be provided on a remote processing device, such as a remote server as part of a cloud-based system.

The screen 70 is the control interface for the user of the digital microscope system 100. In the exemplary embodiment of FIG. 3, the screen 70 is a touch screen, so that the screen 70 provides both user input functionality and image output functionality. The user may control the whole operation of the digital microscope system 100 via the touch screen 70. However, it is also possible that other input devices are provided in addition/as an alternative to the touch screen 70. For example, a keyboard and/or a mouse and/or any other suitable input device may be provided for the user to control the digital microscope system 100. It is also possible that multiple screens are provided for the output of images. It is further possible that images are output to other entities. For example, images may be saved to a hard drive or other data storage medium in file format.

In the exemplary embodiment of FIG. 3, the screen 70 provides two different outputs. In the upper left corner of the screen 70, an image preview 72 is displayed. The image preview 72 is an overview image of the sample that is arranged on the stage of the digital microscope 2. The overview image may be taken with an additional digital camera. The additional digital camera may be arranged next to the objective revolver 24, i.e. it may be arranged with a viewing direction downwards onto the sample and arranged offset from the objective revolver 24. The additional digital camera may be a low-quality, simple digital camera, with the sole purpose of providing a quick overview of the sample, having sufficient detail to allow for a coarse navigation of the sample by the user. It is pointed out that the image preview 72 may be generated in any other suitable manner as well. It is also possible that the image preview 72 is entirely dispensed with and that the user navigates through the sample without such an image preview 72.

In the exemplary use case of FIG. 3, the sample is a biological sample. The sample comprises a cell culture 14, arranged on a clear slide. Hence, from the user's perspective, the sample comprises the cell culture 14, surrounded by empty space.

In the exemplary embodiment of FIG. 3, the user may select an area of interest 74 in the image preview 72. The selection of the area of interest 74 is a user selection that determines the operation of the digital microscope and that determines what will be displayed on the screen 70. This will be explained in detail below. The user selection may be made in any suitable manner, such as with the user's fingers on the touch screen, with a suitable stylus, with an ancillary input device, such as a mouse, with menu-based selection tools, etc., For the depicted use case, it is assumed that the user selected the area of interest 74 with his/her fingers on the touch screen in the portion of the screen 70 where the image preview 72 is depicted. The user selection is indicative of the position and extension of the area of interest. In other words, the user selection contains an unambiguous determination, which portion of the sample is the area of interest for the user. The unambiguous determination may be in any form that allows for the derivation of the position and extension of the area of interest. For example, the user selection, as seen from the digital microscope system 100, may comprise the coordinates of the bottom left corner of the area of interest as well as the two-dimensional extension in the x/y coordinate system of the image preview 72. In another example, the user selection, as seen from the digital microscope system 100, may comprise the coordinates of the top left corner and the bottom right corner of the area of interest. In yet another example, the user selection, as seen from the digital microscope system 100, may comprise a single coordinate, such as the center coordinate of the area of interest, and a zoom level as compared to the size of the entire sample.

On the basis of the user selection, the digital microscope system 100 generates an assembled image, which corresponds to the area of interest 74 and which is displayed in the assembled image screen portion 76. The details of said generation of the assembled image from a system point of view will be described below with respect to FIGS. 4 and 5. From the user point of view, the selection of the area of interest 74 results in an assembled image, which is highly magnified as compared to the image preview 72, in the assembled image screen portion 76, with the assembled image corresponding to the area of interest 74 of the sample. The term corresponding does not necessarily mean that the area of interest and the assembled image are perfectly congruent. For example, it is also possible that the displayed assembled image shows a somewhat larger portion of the sample than the area of interest 74, such as for matching the dimensions of the screen 70.

In the exemplary embodiment of FIG. 3, the assembled image screen portion 76 covers the entire screen 70, with the exception of the image preview 72. It is also possible that the user makes the user selection in the assembled image screen portion 76. For example, the user may navigate the virtual representation of the sample, which may extend beyond the screen 70, via lateral translation and zooming operations. In a particular example, the user may use two-finger zooming commands, as are for example known from smartphone applications. The extension of the area of interest may also be referred to as a zoom level of the area of interest. A user selection comprising the position and the zoom level of the area of interest is therefore also an indication of the position and the extension of the area of interest. In a particular example, the image preview, as taken by a low-quality additional camera, may be initially shown on the full screen, with the user navigating to the area of interest purely by lateral translation and zooming operations.

Figure 4:
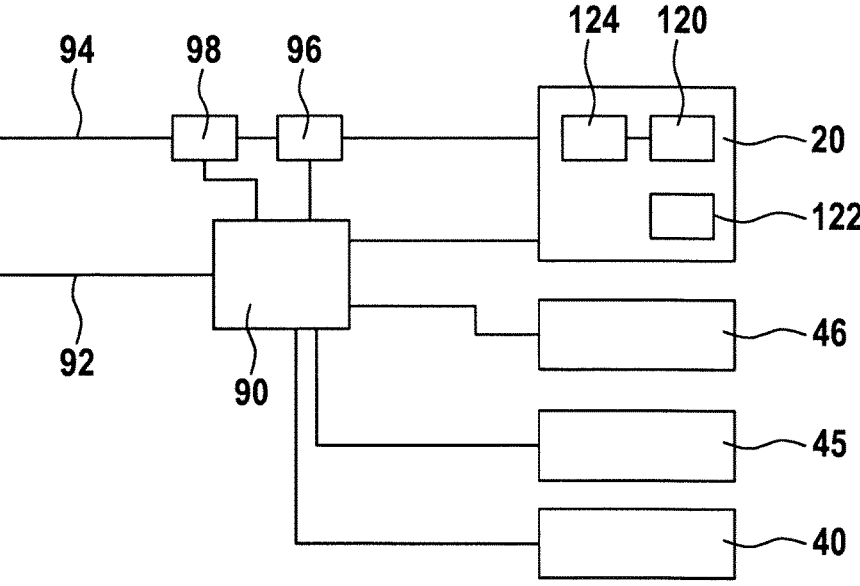
FIG. 4 shows a block diagram of selected components of the digital microscope system of FIG. 3.

FIG. 4 shows a block diagram of selected components of the digital microscope system 100 of FIG. 3. While FIG. 3 had its focus on the user front-end and the user interaction with the digital microscope system 100, the system side, including the hardware backend and the interposed control structure, are described with respect to FIG. 4. The selected components depicted in FIG. 4 have two external connections, namely a user selection input 92 and as assembled image output 94. These two external connections may be seen as the interfaces to the touch screen 70 of FIG. 3. While the user selection is communicated from the touch screen 70 to the components of the digital microscope system 100 of FIG. 4 via the user selection input 92, said components return the assembled image in suitably encoded form to the touch screen 70 for display on the assembled image screen portion 76 via the assembled image output 94.

As stated above, selected components of the digital microscope system 100 are depicted in FIG. 4. In particular, the digital camera 20, the illumination assembly 40, a revolver drive assembly 45, and a stage drive assembly 46, as already described above, are depicted in FIG. 4. The digital camera 20 comprises an image sensor 120, a shutter 122, and an image sensor driver 124. When the shutter 122 opens, the image sensor 120 captures image data, with the image sensor driver 124 reading out the captured image data from the image sensor 120.

The digital microscope system 100 further comprises a control unit 90, an image data post-processing unit 96, and an image assembly unit 98. Each of the control unit 90, the image data post-processing unit 96, and the image assembly unit 98 may be provided in the digital microscope 2 or in the computer 80 or on a remote server. In the alternative, it is also possible that any subset or all of these components are provided in the screen 70. Also, the control unit 90, the image data post-processing unit 96, and the image assembly unit 98 may be distributed among the digital microscope system 100. Further, each of the control unit 90, the image data post-processing unit 96, and the image assembly unit 98 may have hardware components or software components or mixed hardware and software components. In the exemplary embodiment of FIG. 4, the control unit 90, the image data post-processing unit 96, and the image assembly unit 98 are part of a software program that is run on the computer 80 and that is configured for controlling the digital microscope 2.

The control unit 90 is coupled to the user selection input 92 for receiving the user selection regarding the area of interest of the sample. The control unit 90 is further coupled to the illumination assembly 40, to the revolver drive assembly 45, to the stage drive assembly 46, and to the digital camera 20. The control unit is configured to control the illumination assembly 40, the revolver drive assembly 45, the stage drive assembly 46, and the digital camera 20, in particular the shutter 122 thereof and the image sensor driver 124 thereof, depending on the user selection.

The control unit 90 is further coupled to the image data post-processing unit 96 and to the image assembly unit 98. Further, the digital camera 20 is coupled to the image data post-processing unit 96, which in turn is further coupled to the image assembly unit 98, which in turn is further coupled to the assembled image output 94. In this way, the control unit 90 is able to control the image processing chain downstream of the digital camera 20, as will be described below.

On the basis of the user selection, the control unit 90 determines which individual images of the sample are generated, in order to generate an assembled image that corresponds to the area of interest, as indicated by the user selection.

On the basis of the user selection, the control unit 90 first determines which one of the plurality of microscope objectives is selected for generating the individual images. In other words, the control unit 90 first determines the optical magnification that is used for generating the individual images. The control unit 90 may comprise a formulaic relationship between the extensions of the area of interest and associated ones of the plurality of microscope objectives. In other words, the control unit 90 may comprise a function that, depending on the extension of the area of interest, selects a particular one of the plurality of microscope objectives. Instead of/in addition to a formulaic representation, the control unit 90 may comprise a look-up table that assigns the plurality of microscope objectives to ranges of extensions of the area of interest. In other words, the control unit 90 may determine which range a particular extension of a particular area of interest is in and may, on the basis thereof, output an associated microscope objective as the particular one of the plurality of microscope objectives. The control unit 90 controls the revolver drive assembly 45 to place the selected particular one of the plurality of microscope objectives in the optical path of the optical system. In this way, the optical magnification for generating the individual images is set on the basis of the user selection.

In the exemplary embodiment described with respect to FIG. 4, the objective revolver may be equipped with four microscope objectives, namely a 10× magnification microscope objective, a 20× magnification microscope objective, a 40× magnification microscope objective, and a 60× magnification microscope objective. The selection of a particular one of the four microscope objectives may be carried out by the control unit 90 via a ladder of three threshold values. In particular, in case the extension of the area of interest is larger than all three threshold values, the 10× magnification microscope objective may be used. Conversely, in case the extension of the area of interest is smaller than all three threshold values, the 60× magnification microscope objective may be used. The 20× magnification microscope objective and the 40× magnification microscope objective may be used for the extension of the area of interest being larger than 2 threshold values/1 threshold value and smaller than 1 threshold values/2 threshold values. The selected magnification may thus be adapted to the extension of the area of interest.

With the image sensor 120 having a predefined number of image pixels and with the optical system of the digital microscope 2 having a set magnification due to the selection of a particular one of the plurality of microscope objectives, it is set by system parameters how big of a portion of the sample is translated into image data for an individual image. In other words, the size of the portion of the sample that can be captured with a one-time operation of the shutter 122 of the digital camera 120 is set. Given this set size, the control unit 90 determines on the basis of the position and extension of the area of interest, at which individual positions of the sample image data for individual images is captured. For example, the individual positions for a row-wise or column-wise scan of the area of interest may be determined by the control unit 90. The control unit 90 then controls the stage drive assembly 46, the shutter 122, and the image sensor driver 124 in a synchronized manner to generate image data at the determined individual positions. The control unit 90 may control the illumination assembly 40 to provide continuous illumination or to provide intermittent illumination synchronized with the other components.

The control unit 90 may not only control the positions at which image data for individual images is captured. On the basis of the user selection of the area of interest and on the basis of above discussed selection of a particular one of the plurality of microscope objectives, the control unit 90 may also determine whether a full resolution mode is used for generating the individual images or whether a reduced resolution mode is used for generating the individual images. In case a plurality of reduced resolution sub-modes are provided in the digital microscope system 100, the control unit 90 may select one of the full resolution mode and the plurality of reduced resolution sub-modes for generating the individual images. In the exemplary embodiment described with respect to FIG. 4, two reduced resolution sub-modes are provided in the digital microscope system 100, and the control unit 90 selects one of the three different modes for generating the individual images.

The control unit 90 may comprise a function or a look-up table or another suitable assignment tool that takes the user selection and the particular one of the plurality of microscope objectives as inputs and selects one of the full resolution mode and the plurality of reduced resolution sub-modes for generating the individual images. Within each bracket of extensions of areas of interest that are associated with different ones of the plurality of microscope objectives, smaller areas of interest may lead to the full resolution mode being selected and larger areas of interest may lead to the reduced resolution sub-modes being selected. In particular, the larger the area of interest, the lower the reduced number of pixels may be.

As stated above, the image sensor 120 has a predefined number of image pixels. For the full resolution mode, the individual images have the predefined number of image pixels. The image sensor driver 124 reads out the predefined number of image pixels and the image post-processing unit 96 performs any desired kind of post-processing, such as color filtering or other filtering, on image data with the predefined number of image pixels. The individual images, as output by the image post-processing unit 96, have the predefined number of image pixels.

In the digital microscope system 100 of FIG. 4, there are two ways of reducing the number of image pixels for the one or more reduced resolution modes. The first way of reducing the number of image pixels is subsampling the predefined number of image pixels. In particular, the image sensor driver 124 is capable of subsampling the predefined number of image pixels of the image sensor. In other words, the image sensor driver 124 is able to read out a smaller number of image pixels than the predefined number of image pixels. For example, the image sensor driver 124 may be capable of reading out image data for every other or every third or every fourth etc. image pixel, i.e. every n-th image pixel in general terms. In particular, the image sensor driver 124 may be capable to read out every n-th image pixel in both dimensions of the image sensor 124. For the exemplary case of image data for every second pixel being read out by the image sensor driver 124, the number of image pixels is reduced by a factor of 4. For the exemplary case of image data for every third pixel being read out by the image sensor driver 124, the number of image pixels is reduced by a factor of 9.

Subsampling the predefined number of image pixels allows for speeding up the generation of the assembled image in a two-fold manner. First, the reading out of image data from the image sensor 120 is accelerated. In other words, a shorter amount of time is required for reading out the image data from the image sensor 120 per individual image. In this way, the image sensor 120 is ready for new image data more quickly, and image data for subsequent individual images can be captured in quicker succession. Hence, capturing of image data can be accelerated. Second, a smaller amount of image data is provided downstream of the digital camera 20. In particular, a smaller amount of image data is provided to the image post-processing unit 96 and to the image assembly unit 98. The image processing operations, carried out in these downstream units of the digital camera 20, are carried out faster due to the lower number of image pixels.

The second way of reducing the number of image pixels is down-scaling of image data captured by the image sensor 120. In particular, the image post-processing unit 96 is capable of down-scaling the image data captured by the image sensor 120. The term down-scaling refers to reducing the number of pixels by an image filtering operation. In an exemplary case of down-scaling, 4 pixels of a 2×2 pixel window may be replaced by a single pixel. The single replacement pixel may be the result of a comparably simple operation, such as an averaging of the 4 pixels in the 2×2 pixel window. In this way, the number of image pixels is reduced by factor of 4. This approach may be extended to larger pixel windows. It is also possible that a more elaborate approach for calculating replacement pixels is employed. For example, larger image structures, such as contours, may be taken into account for calculating the replacement pixels. Down-sampling is per se known, and it is apparent to the skilled person that various down-sampling approaches may be used.

The down-sampling of image data may be carried out at different points in the image processing chain. For example, the down-sampling may be carried out right at the input of the image post-processing unit 96, i.e. right on the image data as received from the image sensor driver 124. It is also possible that the image post-processing unit 96 applies other image processing, before carrying out down-sampling. Also, other image processing may be applied to the image data after down-sampling at the image post-processing unit 96. The down-sampling may be embedded into the image processing chain in such a way that the other image processing operations are applied to a larger number of pixels or a smaller number of pixels, depending what image size is desired for those other image processing operations.

Down-sampling of image data allows for speeding up the generation of the assembled image, because all ensuing image processing operations after the down-sampling can be carried out faster due to the reduced number of image pixels. The ensuing image processing operations may comprise image processing on the individual image level in the image post-processing unit 96 and do comprise the assembly of the individual images in the image assembly unit 98. The assembled image data output may be provided faster and/or in a more easily processable size. Also, in case the assembled image data output is provided in a stepwise manner, the individual data packets may be provided in quicker succession and/or in a more easily processable size.

As pointed out above, the digital microscope system 100 of FIG. 4 has a full resolution mode and two reduced resolution sub-modes. On the basis of the user selection and the selection of a particular one of the plurality of microscope objectives, the control unit 90 selects one of the full resolution mode and the two reduced resolution sub-modes. The control unit 90 further controls the image sensor driver 124 and the image post-processing unit 96 in accordance with the selected one of the full resolution mode and the two reduced resolution sub-modes.

According to the exemplary embodiment described with respect to FIG. 4, in the full resolution mode, the control unit 90 controls the image sensor driver 124 to read out image data from the image sensor 120 for the full number of predefined image pixels. Further, the control unit 90 controls the image post-processing unit 96 to not carry out any down-sampling on the image data, as received from the image sensor driver 124. For the exemplary case of the image sensor having 1920 pixels×1920 pixels, the individual images also have 1920 pixels×1920 pixels.

According to the exemplary embodiment described with respect to FIG. 4, in the first reduced resolution sub-mode, the control unit 90 controls the image sensor driver 124 to read out image data from the image sensor 120 for every second pixel in each of the two dimensions. Alternatively, the control unit 90 may control the image post-processing unit to carry out down-sampling by a factor of 2 for each of the two dimensions. For the exemplary case of the image sensor having 1920 pixels×1920 pixels, the image sensor driver 124 provides image data for 960 pixels×960 pixels to the image post-processing unit 96, and the individual images also have 960 pixels×960 pixels.

According to the exemplary embodiment described with respect to FIG. 4, in the second reduced resolution sub-mode, the control unit 90 controls the image sensor driver 124 to read out image data from the image sensor 120 for every second pixel in each of the two dimensions. Further, the control unit 90 controls the image post-processing unit to carry out down-sampling by a factor of 2 for each of the two dimensions. For the exemplary case of the image sensor having 1920 pixels×1920 pixels, the image sensor driver 124 provides image data for 960 pixels×960 pixels to the image post-processing unit 96, and the individual images have 480 pixels×480 pixels after down-sampling.

The image assembly unit 98 is configured to assemble the individual images into the assembled image. The assembled image may be presented to the user on a screen, as shown in FIG. 3, or saved into a file for viewing at a later point in time or provided to the user in any other suitable manner. Given the different number of pixels for the individual images in the full resolution mode and the first and second reduced resolution sub-modes, the image assembly unit 98 may take different amounts of time to assemble the individual images. In particular, the image assembly unit 98 may require less time for smaller individual images. The image assembly unit 98 may assemble the individual images via any suitable procedure, such as via suitable stitching algorithms, which are per se known. For the stitching to have high quality, individual images may be generated with an overlap between neighboring individual images.

In the exemplary embodiment of FIG. 4, the control unit 90 selects a particular one of the plurality of microscope objectives and selects one of the full resolution mode and the first and second reduced resolution sub-modes on the basis of the extension of the area of interest, as selected by the user. As described above, the control unit 90 may have a plurality of first thresholds, such as a plurality of first area thresholds, for selecting a particular one of the plurality of microscope objectives. The control unit 90 may further have a plurality of second thresholds, such as a plurality of second area thresholds, for a given microscope objective, in order to select one of the full resolution mode and the first and second reduced resolution sub-modes. The rationale behind the thresholds may be as follows. The smaller the area of interest, the more likely it is that the user is interested in the very details of the sample, hence a better image quality, i.e. a higher resolution of the individual images, is provided. The higher resolution may be provided via a larger magnification by the microscope objective and/or a higher number of image pixels per individual image.

While it has been described that the selection of a particular one of the microscope objectives and the selection of one of the full resolution mode and one or more reduced resolution modes are both carried out and while such a two-fold adaptation of the image generation to the user selection may be highly beneficial in various application scenarios, it is pointed out that the selection between the full resolution mode and the one or more reduced resolution modes may also be dispensed with. It is also possible that the selection between the full resolution mode and the one or more reduced resolution modes is only applied for a subset of the plurality of microscope objectives. For example, it is possible that only the full resolution mode is used for all microscope objectives, with the exception of the microscope objective with the smallest magnification, for which the selection between the full resolution mode and the one or more reduced resolution modes is provided.

Besides controlling the image sensor driver 124 and the image post-processing unit 96 in accordance with the user selection, the control unit 90 may further be configured to control the stage drive assembly 46 and the shutter 122 depending on the user selection. In particular, before starting the generating of the individual images, the control unit 90 may control the stage drive assembly 46 to adapt an x/y offset of the stage, depending on the selected particular one of the plurality of microscope objectives. In this way, the coverage of the area of interest by the individual images may be adapted to the magnification of the optical system. The number of individual images, required for covering the area of interest, may be kept to a minimum by an adapted positioning of the starting point, i.e. by an adapted positioning of the first individual image to be taken. Further in particular, there may be different stage movement patterns for the full resolution mode and the one or more reduced resolution sub-modes. In particular, the different modes may differ with the respect to the image sensor capturing image data while the stage is moving or while the stage is in a stopped position. The stage movement patterns may also be adapted to the selection of the particular one of the plurality of microscope objectives.

In the exemplary embodiment of FIG. 4, in the full resolution mode, the image data is captured by the image sensor 20, when the stage is in a stopped position. In this way, no blurriness due to the movement of the stage is introduced, and the image quality is optimized. However, as the stage is stopped for every individual image, subsequent individual images may be generated at a non-maximum speed. The operation times of the stage drive assembly may be the limiting factor in generating the individual images and the assembled image.

In the exemplary embodiment of FIG. 4, in both the first reduced resolution sub-mode and the second reduced resolution sub-mode, the image data is captured by the image sensor 20, when the stage is moving. In particular, the stage may be moved with a first stage moving speed in the first reduced resolution sub-mode and with a second stage moving speed in the second reduced resolution sub-mode. The second stage moving speed may be faster than the first stage moving speed. By capturing image data during the movement of the stage, the image data for subsequent individual images can be captured in quicker succession, thus enabling a quicker generation of individual images and of the assembled image. The capturing of image data during the movement of the stage works particularly well with the subsampling of the predefined number of pixels by the image sensor driver 124. As described above, the subsampling allows for a quick reading out of image data and makes the image sensor ready for capturing new image data quickly. This quick readiness may be taken advantage of by capturing image data in quick succession during the movement of the stage. The stage moving speed and the level of subsampling may be adapted to each other, depending on the properties and constraints of the technical components involved.

The first and second moving speeds may also be set in such a way that not more than an accepted level of blurriness is introduced into the assembled image. Various factors may be taken into account in this context. On the basis of the properties of the optical system and the physical pixel size in the image sensor, it may be determined what area of the sample relates to a pixel in the image sensor. Further, on the basis of the levels of subsampling and/or down-scaling, it may be determined what area of the sample relates to a pixel in the assembled image. Yet further, on the basis of the accepted level of blurriness in the assembled image, it may determined what maximum stage moving speed is acceptable for keeping the blurriness below the accepted level. The accepted level of blurriness may be defined in relation to the number of neighboring pixels of the assembled image that are affected by a given point in the sample. For example, it may be set as a quality criterion that any given point in the sample may only affect two pixels in the assembled image. This is also referred to as a blurriness of 1 pixel, because any given point in the sample may affect at most one more pixel than in a case where the image data is captured with the stage stopped. On the basis of the accepted level of blurriness of 1 pixel, the maximum stage moving speed may be set to the length of the area of the sample that relates to a pixel in the assembled image, divided by the shutter opening time for one image capturing operation by the image sensor. In case the reading out operation of the captured image data is significant as compared to the shutter opening time, the maximum stage moving speed may also be set to the length of the area of the sample that relates to a pixel in the assembled image, divided by the total capturing and processing time for one image capturing operation by the digital camera 20. Potential further constraints in transporting the image data out of the image sensor 120 to a memory that can provide the image data for further processing independent of the real time may also be taken into account. By setting the first and second stage moving speeds below the respective maximum stage moving speed, as set for the particular operating scenarios of the first and second reduced resolution sub-modes, the blurriness of the assembled image may be kept at an accepted level, while allowing for a very quick provision of the assembled image.

It is further possible that the desired pixel size of the assembled image is part of the user selection, as received by the control unit 90. In other words, the user selection may contain information on a desired resolution of the assembled image. For example, the number of pixels of the screen 70 may be part of the information conveyed to the control unit 90. The control unit 90 may be configured to select a particular one of the plurality of microscope objectives and, if applicable, to select one of the full resolution mode and the one or more reduced resolution (sub-) modes on the basis of the extension of the area of interest and the desired resolution of the assembled image. For example, the control unit 90 may be configured to adapt the thresholds, as described above, depending on the desired resolution of the assembled image and/or may be configured to apply different sets of thresholds, depending on the desired resolution of the assembled image. In particular, the thresholds may be increased for higher desired resolutions. In this way, the quality of the assembled image may be adapted to the output medium and a high-quality assembled image may be presented to the user on the particular output medium used. Conversely, it may be ensured that the quality of the assembled image is not excessive for the desired resolution, which may hurt both in terms of speed of provision of the assembled image as well as in terms of additional processing time being required to reduce the size of the assembled image for being displayed on the output medium.

In order to allow the user to already work on the portion of the assembled image that is already available, the assembled image data may be displayed to the user in a stepwise manner. For example, when a new individual image becomes available from the image post-processing unit 96, the image assembly unit 98 may carry out stitching of this individual image to the previously received individual images. This process may also be considered as a stitching of the newly received individual image to an already available portion of the assembled image. The stitching operation may alter the image data of the individual image and may therefore be seen as a filter operation. The filtered individual image may be provided to the screen and may be displayed together with the previously available portion of the assembled image, thus increasing the available, displayed portion of the assembled image. On the screen, the user may experience this process as a stepwise building up of the assembled image. The efficiency of the user in analyzing the sample may thus be increased. For example, the display of the already available portion of the assembled image may put the user in a position to update the area of interest, e.g. via zooming in, before the whole assembled image is provided. It may also put the user in a position to find a particular feature he/she is looking for in the sample, before the whole assembled image is provided. The user may experience a kind of live interaction with the sample.

Figure 5:
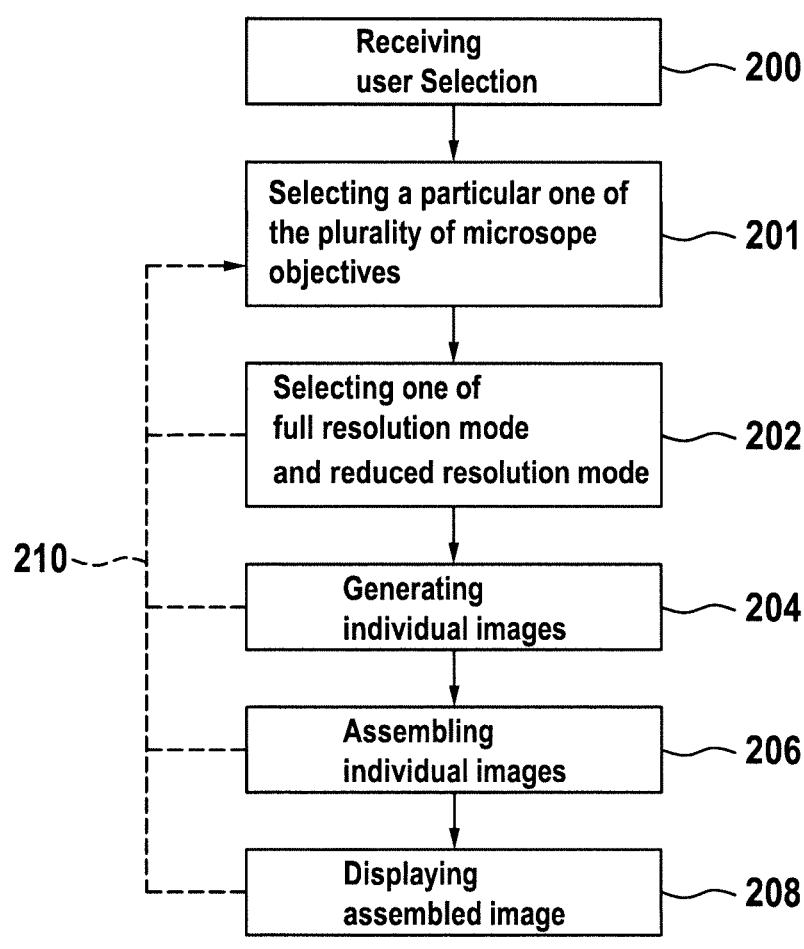
FIG. 5 shows a flow chart of a method of providing an assembled image using a digital microscope in accordance with an exemplary embodiment of the invention.

FIG. 5 shows a flow chart of a method of providing an assembled image using a digital microscope in accordance with an exemplary embodiment of the invention. At step 200, a user selection regarding an area of interest of the sample is received. At step 201, based on the user selection received at step 200, a particular one of the plurality of microscope objectives, available at the objective revolver, is selected. At step 202, based on the user selection received at step 200 and based on the particular one of the plurality of microscope objectives selected at step 201, one of a full resolution mode and a reduced resolution mode, potentially one of a full resolution mode and a plurality of reduced resolution sub-modes, is selected. In accordance with the microscope objective selected at step 201 and the mode selected at step 202, individual images of individual portions of the area of interest are generated at step 204. For generating the individual images in accordance with the selected mode, all or a subset of the revolver drive assembly, the illumination assembly, the stage drive assembly, the shutter of the digital camera, the image sensor driver of the digital camera, and the image post-processing unit are controlled in accordance with the selected microscope objective and the selected mode. At step 206, the individual images are assembled and the assembled image generated. At step 208, the assembled image is displayed on a screen to the user.

It is pointed out that the steps 204, 206, and 208 may be carried out in the depicted order. It is also possible that the steps 204, 206, and 208 are carried out in a partially parallel manner. As discussed above, the assembly of individual images and, potentially, also the display of the assembled image may already take place for a portion of the area of interest, while the individual images for another portion of the area of interest are still generated.

In the exemplary embodiment of FIG. 5, the steps 201, 202, 204, 206, and 208 may be carried out in a very short timeframe, such that the user experiences a high responsiveness of the digital microscope system. In particular, after the particular one of the plurality of microscope objectives is selected, the selected microscope objective may be placed in the optical path of the optical system within a preparation interval of less than 1 second, in particular less than 0.5 seconds. Further, the steps 204, 206, and 208 may be carried out in a recording interval of less than 10 seconds, in particular less than 5 seconds. In particular, the particular one of the plurality of microscope objectives and, if applicable, the one of the full resolution mode and the reduced resolution (sub-) mode(s) may be selected in such a way that the given desired recording intervals can be achieved. In other words, the recording interval may be a time constraint that may be factored in for the selection of the microscope objective and, if applicable, the selection of the full resolution mode and the reduced resolution (sub-) mode(s). In this way, it is possible that the image quality may be traded off with respect to guaranteed provision times of the assembled image.

In the exemplary embodiment of FIG. 5, the method may be configured to react to an updated user selection regarding an updated area of interest at any point throughout the method. In particular, the method may be configured to interpret the reception of an updated user selection as an interrupt and stop the step or steps presently being carried out. The method may interpret the updated user selection as an interrupt and may go back to step 201 on the basis of the updated user selection. This is indicated with the dashed line 210 in FIG. 5, illustrating the receiving of the updated user selection, possible at any point throughout the method. It is possible that individual images, generated in the previous instance of step 204 and still relevant for the updated user selection, are re-used and not re-generated. In this way, the generation of the assembled image may be carried out very quickly for slight changes in the area of interest. Also, the portion of the assembled image that still relates to the updated area of interest and that was already generated in the previous instance of step 206 may be continued to be displayed on the screen. It may be supplemented with further portions of the assembled image of the updated area of interest in a stepwise manner. In this way, downtimes of the screen, which may interfere with the user's analysis due to him/her having to adapt to a fully new display on the screen, may be prevented.

Figure 6:
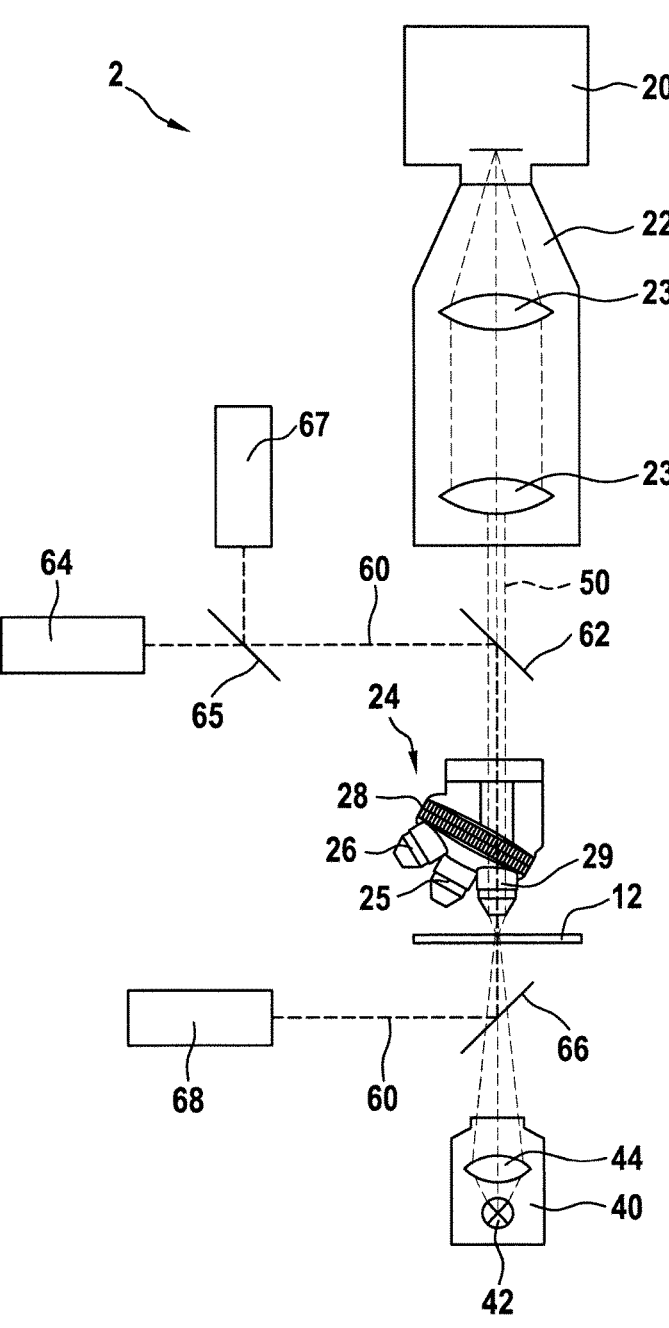
FIG. 6 shows a schematic diagram of selected components of a digital microscope in accordance with another exemplary embodiment of the invention.

FIG. 6 shows selected components of a digital microscope 2 in accordance with another exemplary embodiment of the invention in a schematic view. Many of the depicted components of the digital microscope 2 of FIG. 6 are the same and depicted in the same manner as the corresponding components of the digital microscope 2 of FIG. 2. Their arrangement and functioning will not be described again, and reference is made to their description with respect to FIG. 2 and the other FIGS. above. As compared to the digital microscope 2 of FIG. 2, the digital microscope 2 of FIG. 6 has enhanced functionality, as will be discussed below.

The digital microscope 2 of FIG. 6 comprises a first diverter 62, a second diverter 65, and a first function enhancing detector 67. The first diverter 62 is arranged between the objective revolver 24 and the tube objective 22 and is provided to direct light away from above described optical path from the sample 12 through the objective revolver 24, through the tube objective 22, and to the digital camera 20. In the exemplary embodiment of FIG. 6, the first diverter 62 is a dichroic bandpass mirror that is configured to divert light of a narrow wavelength band away from said optical path. Being a dichroic bandpass mirror, the first diverter 62 may be permanently placed in the optical path between the objective revolver 24 and the tube objective 22 and may only have very little impact on the broad band visible light, emitted by the illumination assembly 40 towards the digital camera 20. It is also possible that the first diverter 62 is a movable component that is movable to a diverting position between the objective revolver 24 and the tube objective 22, as shown in FIG. 6, and is movable to a dis-engaged position out of the optical path between the objective revolver 24 and the tube objective 22. In case the first diverter 62 is a movable component, it may also be a simple reflector, reflecting all or a large portion of the light incident thereon. The first diverter 62 being a broadband reflector may also be beneficial in case of multiple enhanced functions being provided, as will be discussed below. It is further also possible that the first diverter 62 is an electrically controlled component whose reflective/transmissive properties can be electrically controlled, e.g. via the application of a controlling electric field or a controlling electric potential. For example, the first diverter 62 may be a birefringent crystal mirror. The first diverter 62 may also be made from an acousto-optically controlled crystal material.

The first diverter 62 is arranged to direct illumination in the direction of a function enhancing illumination assembly 64, which will be described below. In particular, the first diverter 62 is arranged at a 45° angle with respect to the optical path between the objective revolver 24 and the tube objective 22, such that the diverted illumination leaves the optical path in a substantially orthogonal manner. Between the first diverter 62 and the function enhancing illumination assembly 64, there is arranged the second diverter 65. The second diverter 65 is arranged to direct illumination, coming from the first diverter 62, towards the first function enhancing detector 67. The second diverter 65 may be a dichroic bandpass mirror and may be embodied in accordance with any of the options described above with respect to the first diverter 62. It is also possible that the second diverter 65 is a semi-permeable mirror. In the exemplary embodiment of FIG. 6, the second diverter 65 is arranged at a 45° angle with respect to the optical path between the first diverter 62 and the function enhancing illumination assembly 64.

The first function enhancing detector 67 may be a photodetector with high sensitivity at a particular wavelength. In particular, the first function enhancing detector 67 may be a monochromatic light detector, whose sensitivity is adapted to a particular wavelength/to a particular wavelength range. In this way, the first function enhancing detector 67 may be particularly well-suited to detecting the reaction of the sample 12 to excitation with a particular wavelength.

As stated above, the digital microscope 2 further comprises a function enhancing illumination assembly 64. The function enhancing illumination assembly 64 is arranged to direct an illumination/excitation towards the second diverter 65. In particular, the function enhancing illumination assembly 64 is arranged to direct an illumination/excitation towards the second diverter 65 in such a way that, once the illumination/excitation passes the second diverter 65, it travels to the first diverter 62. In the exemplary embodiment of FIG. 6, the second diverter 65 is a narrow band dichroic bandpass mirror that passes selective wavelengths/a selective wavelength range, emitted by the function enhancing illumination assembly 64, through towards the first diverter 62. The passband of the second diverter 65 is in particular adapted to a narrow band illumination/excitation, emitted by the function enhancing illumination assembly 64. With the function enhancing illumination assembly 64 being a narrow band illumination assembly and the second diverter 65 being a narrow band dichroic bandpass mirror, the second diverter 65 may be permanently arranged between the function enhancing illumination assembly 64 and the first diverter 62 and may allow for both passing of illumination/excitation and diversion of a sample response, as will be laid out below.

In the exemplary embodiment of FIG. 6, the function enhancing illumination assembly 64 comprises a laser light source. In operation, the laser light source provides a highly collimated, very narrow band light beam. Being highly collimated, said light beam is depicted as a single line light path 60 in FIG. 6. The wavelength of the laser light source may be adapted for a particular examining operation of the sample 12, and the first function enhancing detector 67 may have particularly high sensitivity with respect to the particular wavelength of the laser light source and/or with respect to an expected response wavelength/response wavelength range of the sample 12 upon excitation with the particular wavelength of the laser light source. The laser light source may be seen as a point light source, and the first function enhancing detector 67 may have a single detection cell or may have a small area of detection cells. It is also possible that the first function enhancing detector 67 is a spectroscopic detector, having a prism or other suitable optical component for splitting up different wavelengths and multiple detector cells for detecting the respective intensities of the different wavelengths. In this way, a spectroscopic analysis of the sample 12 in response to a highly collimated laser excitation at a very confined area of the sample 12 may be carried out.

In operation, the light beam of the laser light source exits the function enhancing illumination assembly 64, passes the second diverter 65, is reflected towards the objective revolver 24 by the first diverter 62, passes the objective revolver 24, and excites the sample 12. The sample 12 responds to the excitation, and the sample response travels back through the objective revolver 24, is reflected by the first diverter 62, is reflected by the second diverter 65, and is measured by the first function enhancing detector 67. It is pointed out that this set-up may be used for various kinds of additional measurements, in particular for various kinds of spectroscopic measurements and/or various kinds of fluorescence-based measurements.

In order for the objective revolver 24 to have low interference with the light path 60, the objective revolver 24 is equipped with a fourth microscope objective 29 in the exemplary embodiment of FIG. 6. In the depicted operating scenario of FIG. 6, the fourth microscope objective 29 is placed in the optical path between the sample 12 and the first diverter 62. In the exemplary embodiment of FIG. 6, the fourth microscope objective 29 is adapted to pass the laser light from the function enhancing illumination assembly 64 to the sample 12 and the response from the sample 12 towards the first function enhancing detector 67 with as little interference as possible. The fourth microscope objective 29 may in particular be adapted for maximum transparency with respect to the wavelength of the laser light source. In the operating scenario of FIG. 6, the first microscope objective 25 and the second microscope objective 26 are moved out of the light path between the sample 12 and the first diverter 62. In this way, the objective revolver 24 may contribute to a highly effective provision of additional functionality within the framework of the digital microscope 2.

In the exemplary embodiment of FIG. 6, the digital microscope 2 further comprises a third diverter 66 and a second function enhancing detector 68. The third diverter 66 is arranged between the illumination assembly 40, also referred to as visible light illumination assembly herein, and the sample 12. In the exemplary embodiment of FIG. 6, the third diverter 66 is a narrow band dichroic bandpass mirror that passes almost all of the white light, emitted by the illumination assembly 40, through to the sample 12. The third diverter 66 is further arranged to direct illumination/excitation from the function enhancing illumination assembly 64 and/or a sample response to the illumination/excitation by the function enhancing illumination assembly 64 towards the second function enhancing detector 68. The reflective wavelength band of the third diverter 66 is in particular adapted to the narrow band illumination/excitation, emitted by the function enhancing illumination assembly 68. With the function enhancing illumination assembly 64 being a narrow band illumination assembly and the third diverter 66 being a narrow band dichroic bandpass mirror, the third diverter 66 may be permanently arranged between the illumination assembly 40 and the sample 12. However, it is also possible that the third diverter 66 is movable between a diverting position, as illustrated in FIG. 6, and a disengaged position out of the optical path between the illumination assembly 40 and the sample 12. In the latter case, the third diverter 66 may also be a standard reflector. It is also possible that the third diverter 66 is a semi-permeable mirror and is permanently arranged at the depicted position. With the third diverter 66 and a second function enhancing detector 68, additional measurement capabilities may be implemented in the digital microscope 2. The response of the sample 12 to a passing illumination/excitation, in particular to a passing illumination/excitation with a particular wavelength, may be analyzed. The second function enhancing detector 68 may be used for various kinds of additional measurements, in particular for various kinds of spectroscopic measurements and/or various kinds of fluorescence-based measurements.

It is pointed out that the optical path 60 may also be reversed, i.e. that a function enhancing illumination assembly may be provided at the position where the second function enhancing detector 68 is shown in FIG. 6 and that the illumination/excitation reaches the sample 12 from the bottom in the viewing direction of FIG. 6.

It is pointed out that the enhanced functionality, as described hereinbefore, may also be provided in combination with a magnifying microscope objective on the objective revolver. In this case, the first and/or second function enhancing detector 67, 68 may be provided with a tube objective or a condenser or other optical components for directing the illumination towards a suitable detector cell or detector cell array.

It is further pointed out that individual images, captured by the first and/or second function enhancing detector, may be generated in a full resolution mode or in one or more reduced resolution (sub-) modes, as described above with respect to the digital camera 20. In other words, above described measures for trading off image quality/resolution and speed of provision of an assembled image apply to the operation of the function enhancing detector(s) in an analogous manner. This is in particular the case, when an extended portion of the sample is to be analyzed with the enhanced functionality.

It is further pointed out that multiple additional functions may be provided in the framework of the digital microscope 2. In particular, it is possible that a plurality of function enhancing illumination assemblies and/or a plurality of function enhancing detectors are provided. Said function enhancing illumination assemblies and/or said function enhancing detectors may be arranged on revolver-type structures at each of the positions of the function enhancing illumination assembly 64, the first function enhancing detector 67 and the second function enhancing detector 68 depicted in FIG. 6. In this way, a desired one of the multiple function enhancing illumination assemblies and/or a desired one of the multiple function enhancing detectors may be suitably arranged for achieving a light path substantially corresponding to the depicted light path 60 or substantially corresponding to a portion of the depicted light path 60.

With the set-up depicted in FIG. 6, one or more of a Raman spectroscopy analysis, a CARS analysis, an SRS analysis, an SHG analysis, a TPEF analysis, and a FLIM analysis of the sample 12 or of selected portions of the sample 12 may be carried out.

The inspection of the sample via the generation of assembled images with the visible light illumination assembly 40 and the digital camera 20 and the inspection via above described enhanced functionality may complement each other and may provide a convenient way of a multi-fold analysis of a sample. For example, the user may view an assembled image, assembled from individual images taken with the digital camera 20, and may mark points of interest on said assembled image. The digital microscope system may then provide additional measurements regarding these points of interest with the at least one function enhancing illumination assembly and the at least one function enhancing detector. With the help of the objective revolver, the switch between the capturing of individual images by the digital camera 20 and the additional analysis via the at least one function enhancing illumination assembly and the at least one function enhancing detector may then be carried out by the digital microscope system without further user interaction, in particular without manual re-configuration of the optical path of the digital microscope 2.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A method of providing an assembled image using a digital microscope, the digital microscope comprising an optical system having an objective revolver equipped with a plurality of microscope objectives having objective-specific magnifications, an image sensor having a predefined number of image pixels, and a stage for holding a sample, the stage being movable in relation to the optical system and the image sensor, the method comprising:

receiving a user selection regarding an area of interest of the sample, the user selection being indicative of the position and extension of the area of interest;

depending on the user selection, selecting a particular one of the plurality of microscope objectives and controlling the objective revolver to place the particular one of the plurality of microscope objectives into an optical path of the optical system, wherein said selecting of the particular one of the plurality of microscope objectives is based on the extension of the area of interest and the objective-specific magnifications of the plurality of microscope objectives;

depending on the user selection and the selected particular one of the plurality of microscope objectives, selecting one of a full resolution mode and a reduced resolution mode;

moving the stage with respect to the optical system and the image sensor, and generating individual, partial images of the area of interest, wherein the individual, partial images are generated with the predefined number of image pixels in the full resolution mode and wherein the individual, partial images are generated with a reduced number of image pixels, as compared to the predefined number of image pixels, in the reduced resolution mode; and combining the individual, partial images into the assembled image, representing the area of interest.

2. The method of claim 1, wherein the objective revolver comprises a motor and wherein said controlling of the objective revolver comprises controlling the motor to rotate the objective revolver to place the particular one of the plurality of microscope objectives into the optical path of the optical system.

3. The method of claim 1, wherein said selecting of the particular one of the plurality of microscope objectives is carried out such that said moving of the stage with respect to the optical system and the image sensor and said generating of the individual images of the area of interest takes place in a recording interval of less than 10 seconds, in particular less than 5 seconds.

4. The method of claim 1, wherein said controlling of the objective revolver to place the particular one of the plurality of microscope objectives into the optical path of the optical system takes place in a preparation interval of less than 1 second, in particular less than 0.5 seconds.

5. The method of claim 1, wherein the objective revolver is equipped with 3 or 4 or 5 microscope objectives, and/or wherein the plurality of microscope objectives comprise at least two of a 10× magnification microscope objective, a 20× magnification microscope objective, a 40× magnification microscope objective, a 60× magnification microscope objective, and a 100× magnification microscope objective.

6. The method of claim 1, further comprising:

adapting an x/y offset of the stage, depending on the area of interest and the particular one of the plurality of microscope objectives, and/or focusing the stage with respect to the particular one of the plurality of microscope objectives.

7. The method of claim 1, wherein said receiving of the user selection regarding the area of interest comprises receiving a selection of a particular rectangular portion within the sample, in particular receiving a selection of a particular rectangular portion indicated via two opposite corner points, and/or wherein said receiving of the user selection regarding the area of interest comprises receiving a point selection within the sample and defining a rectangular portion around the point selection as the area of interest.

8. The method of claim 1, wherein the digital microscope comprises a diverter, arranged between the objective revolver and the image sensor or movable to a diverting position between the objective revolver and the image sensor, and at least one function enhancing detector, optically coupled to the diverter, and wherein the method comprises:

depending on the user selection, which additionally comprises a function selection, selecting a particular one of the plurality of microscope objectives and controlling the diverter and/or the at least one function enhancing detector to carry out at least one additional measurement with respect to the area of interest.

9. The method of claim 8, wherein the at least one function enhancing detector comprises at least one of a Raman spectroscopy detector, a CARS detector, an SRS detector, an SHG detector, a TPEF detector, and a FLIM detector.

10. The method of claim 1, wherein the user selection further indicates a representation resolution indicative of a desired resolution of the assembled image, wherein the representation resolution is in particular indicative of a screen resolution of a screen for depicting the assembled image.

11. The method of claim 1, further comprising:

receiving an updated user selection regarding an updated area of interest of the sample, the updated user selection being indicative of the position and extension of the updated area of interest;

interrupting the one or more method steps currently being carried out;

depending on the updated user selection, re-selecting a particular one of the plurality of microscope objectives and controlling the objective revolver to place the particular one of the plurality of microscope objectives into an optical path of the optical system;

moving the stage with respect to the optical system and the image sensor, and generating individual images of the updated area of interest; and combining the individual images into the assembled image, representing the updated area of interest.

12. A digital microscope system comprising:

an optical system having an objective revolver equipped with a plurality of microscope objectives having objective-specific magnifications;

an image sensor having a predefined number of image pixels;

a stage for holding a sample;

a stage drive assembly for moving the stage in relation to the optical system and the image sensor; and a control unit for controlling generation of image data for an assembled image, wherein the control unit is configured to:

receive a user selection regarding an area of interest of the sample, the user selection being indicative of the position and extension of the area of interest;

depending on the user selection, select a particular one of the plurality of microscope objectives and control the objective revolver to place the particular one of the plurality of microscope objectives into an optical path of the optical system, wherein the particular one of the plurality of microscope objectives is selected based on the extension of the area of interest and the objective-specific magnifications of the plurality of microscope objectives;

depending on the user selection and the selected particular one of the plurality of microscope objectives, select one of a full resolution mode and a reduced resolution mode;

control the stage drive assembly to move the stage with respect to the optical system and the image sensor; and control the generation of individual, partial images of the area of interest, wherein the individual, partial images are generated with the predefined number of image pixels in the full resolution mode and wherein the individual, partial images are generated with a reduced number of image pixels, as compared to the predefined number of image pixels, in the reduced resolution mode.

13. A non-transitory computer readable medium storing executable computer program instructions, the computer program instructions when executed cause a computer processor to carry out a method for providing an assembled image using a digital microscope, the digital microscope comprising an optical system having an objective revolver equipped with a plurality of microscope objectives having objective-specific magnifications, an image sensor having a predefined number of image pixels, and a stage for holding a sample, the stage being movable in relation to the optical system and the image sensor, the method comprising:

receiving a user selection regarding an area of interest of the sample, the user selection being indicative of the position and extension of the area of interest;

depending on the user selection, selecting a particular one of the plurality of microscope objectives and controlling the objective revolver to place the particular one of the plurality of microscope objectives into an optical path of the optical system, wherein said selecting of the particular one of the plurality of microscope objectives is based on the extension of the area of interest and the objective-specific magnifications of the plurality of microscope objectives;

depending on the user selection and the selected particular one of the plurality of microscope objectives, selecting one of a full resolution mode and a reduced resolution mode;

instructing the stage to move with respect to the optical system;

instructing the image sensor to generate image data;

on the basis of the image data, generating individual images of the area of interest, wherein the individual, partial images are generated with the predefined number of image pixels in the full resolution mode and wherein the individual, partial images are generated with a reduced number of image pixels, as compared to the predefined number of image pixels, in the reduced resolution mode; and combining the individual, partial images into the assembled image, representing the area of interest.

* * * * *